(12) United States Patent
Kumar et al.

(10) Patent No.: US 8,671,174 B2
(45) Date of Patent: Mar. 11, 2014

(54) MANAGEMENT OF SHARED CLIENT DEVICE AND DEVICE MANAGER

(76) Inventors: Prem Jothipragasam Kumar, San Diego, CA (US); Thomas O'Neil, La Jolla, CA (US); Robbin Hughes, San Diego, CA (US)

( * ) Notice: Subject to any disclaimer, the term of this patent is extended or adjusted under 35 U.S.C. 154(b) by 0 days.

(21) Appl. No.: 12/761,592

(22) Filed: Apr. 16, 2010

(65) Prior Publication Data

US 2011/0066711 A1     Mar. 17, 2011

Related U.S. Application Data

(60) Provisional application No. 61/170,243, filed on Apr. 17, 2009, provisional application No. 61/170,287, filed on Apr. 17, 2009, provisional application No. 61/180,718, filed on May 22, 2009, provisional application No. 61/170,326, filed on Apr. 17, 2009.

(51) Int. Cl.
*G06F 15/173* (2006.01)

(52) U.S. Cl.
USPC .......................................... 709/223; 709/226

(58) Field of Classification Search
USPC ............... 709/204–207, 223–229; 726/26–31
See application file for complete search history.

(56) References Cited

U.S. PATENT DOCUMENTS

| | | | | |
|---|---|---|---|---|
| 6,732,176 B1 * | 5/2004 | Stewart et al. | ................ | 709/227 |
| 7,644,044 B2 * | 1/2010 | Candelore | ...................... | 705/57 |
| 7,987,360 B2 * | 7/2011 | Luo et al. | ....................... | 713/163 |
| 8,131,875 B1 * | 3/2012 | Chen et al. | .................... | 709/246 |
| 8,271,649 B2 * | 9/2012 | Kalofonos et al. | ............ | 709/225 |
| 2002/0091667 A1 * | 7/2002 | Jaipuria et al. | .................... | 707/1 |
| 2006/0176281 A1 * | 8/2006 | Bennett et al. | ............... | 345/169 |
| 2008/0062958 A1 * | 3/2008 | Jonsson et al. | ............... | 370/350 |
| 2008/0072292 A1 * | 3/2008 | Narjala | .......................... | 726/4 |
| 2008/0249946 A1 * | 10/2008 | Candelore | ...................... | 705/59 |
| 2008/0271109 A1 * | 10/2008 | Singh et al. | ...................... | 726/1 |
| 2009/0027222 A1 * | 1/2009 | Larsson et al. | ............. | 340/686.6 |
| 2009/0063691 A1 * | 3/2009 | Kalofonos et al. | ............ | 709/229 |
| 2009/0064346 A1 * | 3/2009 | Larsson et al. | .................. | 726/29 |
| 2009/0132813 A1 * | 5/2009 | Schibuk | ....................... | 713/158 |
| 2009/0300357 A1 * | 12/2009 | Kumar et al. | ................. | 713/171 |
| 2009/0313680 A1 * | 12/2009 | Hirano | .............................. | 726/3 |
| 2010/0202345 A1 * | 8/2010 | Jing et al. | ...................... | 370/328 |
| 2010/0205309 A1 * | 8/2010 | Skog et al. | .................... | 709/227 |
| 2010/0242089 A1 * | 9/2010 | Bi | ..................................... | 726/3 |
| 2010/0299758 A1 * | 11/2010 | Hyun et al. | ..................... | 726/28 |
| 2011/0161697 A1 * | 6/2011 | Qi et al. | ........................ | 713/320 |

OTHER PUBLICATIONS

Bryan Ford, Jacob Strauss, Chris Lesniewski-Laas, Sean Rhea, Frans Kaashoek, Robert Morris, Persistent personal names for globally connected mobile devices, Proceedings of the 7th symposium on Operating systems design and implementation, Nov. 6-8, 2006, Seattle, Washington.*

"Secure Sockets Layer", Newton's Telecom Dictionary, 18th ed., Feb. 2002.*

\* cited by examiner

*Primary Examiner* — Brendan Higa

(57) ABSTRACT

A method of classifying a client device and a device manager to allow for end users to share devices is described.

13 Claims, 29 Drawing Sheets

MANAGEMENT OF SHARED CLIENT DEVICE AND DEVICE MANAGER

RELATED APPLICATIONS

The present application is based on, and claims priority from, U.S. Provisional Application Nos. 61/170,243, 61/170,326, and 61/170,287, filed Apr. 17, 2009; and 61/180,718, filed May 22, 2009, the disclosures of which are hereby incorporated by reference herein in their entireties.

BACKGROUND

Currently, end user devices do not have knowledge of other devices owned by the end user and do not share services, components, or elements of the device with other devices. Services, if any, are usually tied to silo networks.

DESCRIPTION OF THE DRAWINGS

One or more embodiments are illustrated by way of example, and not by limitation, in the figures of the accompanying drawings, wherein elements having the same reference numeral designations represent like elements throughout and wherein.

DETAILED DESCRIPTION

Figure 1:
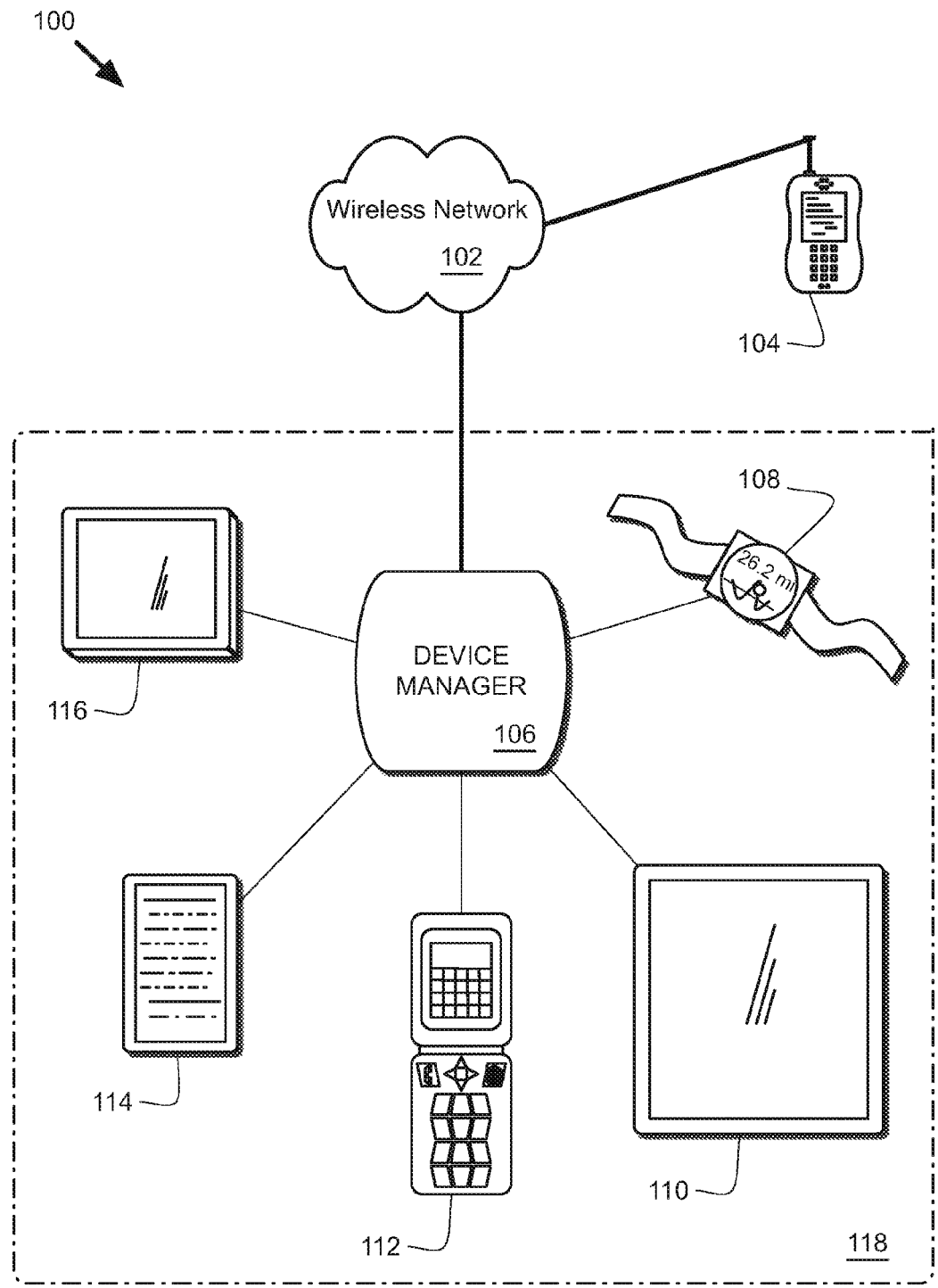
FIG. 1 is a high-level diagram of an environment in which an embodiment may be practiced.

FIG. 1 depicts a high-level diagram of an environment 100 in which an embodiment of the present invention may be practiced. Environment 100 comprises a wireless network 102 communicatively connecting a wireless device 104 (also referred to as a legacy wireless device) with a device manager 106 according to an embodiment. Device manager 106 is communicatively coupled with client devices (108, 110, 112, 114, 116) comprising: a monitor device 108, a tablet-based device 110, a wireless device 112, a touch-screen based wireless device 114, and a personal positioning device 116. Device manager 106 is arranged to communicate with each of the client devices in a predetermined manner and, where appropriate, enable communication between one or more client devices and wireless network 102 and/or wireless device 104. In particular, device manager 106 controls the allocation to, and utilization of, client devices to perform particular functionality. Each of the client devices in communication with device manager 106 is within a predetermined region 118 proximate the device manager, i.e., in order to communicate with device manager 106 the client devices are positioned within predetermined region 118.

For clarity and ease of understanding, only a single device manager, wireless network, and wireless device are discussed. In at least some embodiments, there may be more than one device manager, wireless network, and/or wireless device. Additionally, in at least some embodiments, there may be more than one predetermined region with respect to a device manager. Further, additional client devices of varying size, shape, and functionality may be configured to communicate with a device manager.

Figure 24:
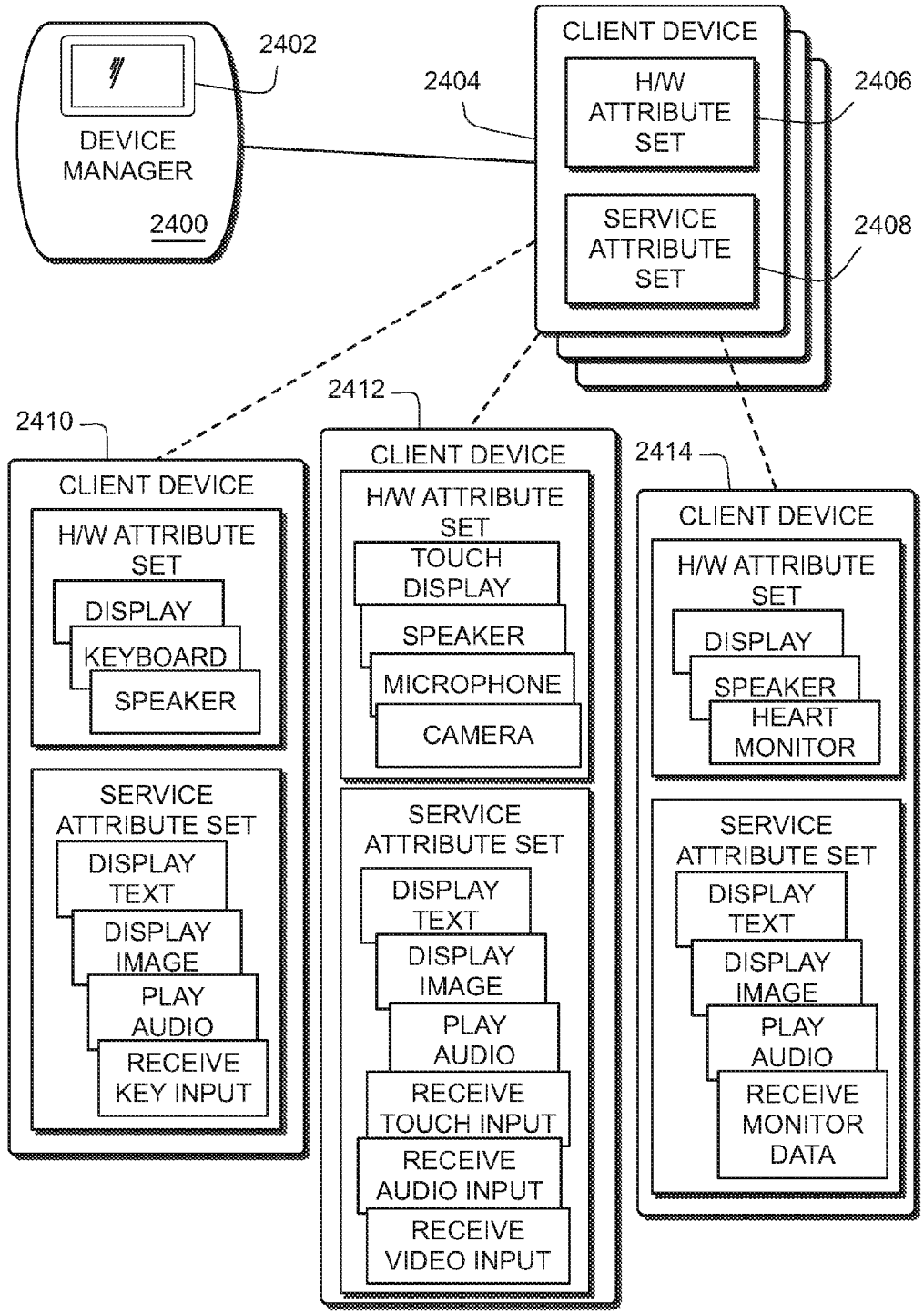
FIG. 24 is a high-level functional block diagram of a client device according to several embodiments.

FIG. 24 depicts a functional block diagram of a device manager 2400, having a display 2402, and being in communication with a client device 2404. Client device 2404 comprises a hardware (H/W) attribute set 2406 and a service attribute set 2408. H/W attribute set 2406 corresponds to a set of device capabilities of a particular client device. Service attribute set 2408 corresponds to a set of service capabilities of a particular client device. The H/W attribute set 2406 and service attribute set 2408 content may vary for different client devices.

In at least some embodiments, a "service" is defined as a set of events performed by different client devices and/or hardware components and/or service components of a client device within predetermined region 118 and communicating with device manager 106.

FIG. 24 also depicts detailed views of several exemplary client devices 2410, 2412, and 2414 which may comprise client device 2404. Device manager 2400, in accordance with the particular embodiment, comprises display 2402 enabling the display of information to a user of the device manager, e.g., display may be used to display a count of client devices to which the device manager is connected.

Client devices 2410, 2412, and 2414 are example client devices according to differing embodiments of client devices. The number and type of H/W attribute set and service attribute set content vary in accordance with one or more different embodiments.

For example, client device 2410 comprises a H/W attribute set including a display, a keyboard, and a speaker and a service attribute set including a display text service, a display image service, a play audio service, and a receive key input service. An example client device 2410 may be a handheld or portable computer system having a display, keyboard, and speaker while lacking an audio input device.

Example client device 2412 comprises a H/W attribute set including a touch display, a speaker, a microphone, and a camera and a service attribute set including a display text service, a display image service, a play audio service, a receive touch input service, a receive audio input service, and a receive video input service. An example client device 2412 may be a tablet-based device having a touch-screen display, a speaker, a microphone, and a camera while lacking a keyboard.

Example client device 2414 comprises a H/W attribute set including a display, a speaker, and a heart rate monitor and a service attribute set including a display text service, a display image service, a play audio service, and a receive monitor data service. An example client device 2414 may be a wristwatch-sized device having a display, a speaker, and a heart rate monitor while lacking a keyboard, camera, and microphone.

In operation, device manager 2400 initially communicates with the client devices 2410, 2412, 2414 and receives information regarding the corresponding H/W attribute set and service attribute set content of the client devices. Subsequent to the initial communication, device manager 2400 is able to communicate with one or more client devices in accordance with the received information to make use of the specific hardware and/or service of the client device.

A system for client devices to be shared between end users in a personal distributed network is provided. Methods are provided to ensure that the end user identity and personal information are properly managed when client devices are shared. The method provides mechanism for a client device to use one of "neighboring" device managers and complete a service. The method provides mechanism for "neighboring" device manager to protect it's data and identity when it is used by a "neighboring" client device.

In at least some embodiments, a client device is configured to communicate solely with a single device manager, i.e., a primary device manager. In at least some other embodiments, a client device is configured to communicate with non-primary device managers. Conversely, in at least some embodiments, a device manager may be configured to communicate with primary and/or non-primary client devices. That is, device managers and client devices may be configured as one of at least three types: primary, secondary, and universal. In at least some embodiments, there may be at least two types: primary and universal.

A primary device manager is assigned to a single end user entity, e.g., a single person, and communicates with one or more primary client devices. A collection of primary device managers and client devices form a core personal distributed network (PDN). There may be more than one primary device manager, e.g., corresponding to home and work accounts. A client device may be configured to communicate with a secondary device manager. A secondary device manager is a device manager that does not belong to the core PDN, but has been configured to communicate with client devices of selected primary device managers, e.g., client devices within a family. A universal client device can communicate with any device manager, either primary or secondary. Similarly, a universal device manager can communicate with any client device, either primary or secondary.

Figure 29:
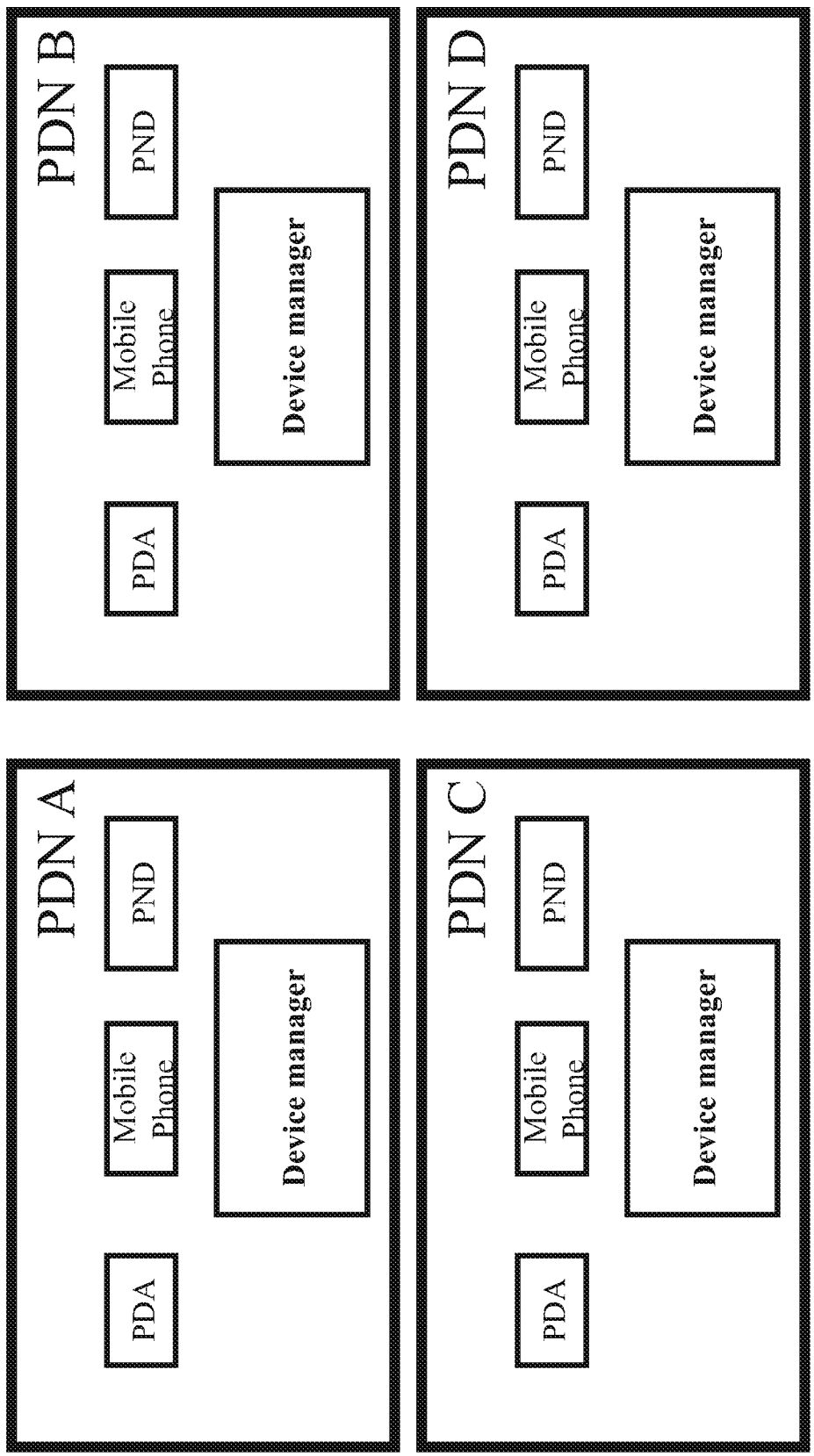
FIG. 29 is a high-level functional block diagram of client devices and device managers communicating in personal distributed networks in accordance with an embodiment.

FIG. 29 depicts a high-level view of client devices and device managers communicating in personal distributed networks. The mechanism by which a service is set up varies based on the type of client devices and device manager. If the communication is between a primary client device and a primary device manager, then pre-defined methods are used to set up services. If the communication is between a primary client device and a secondary device manager, then the client device takes temporary ownership of the service and stores the information pertaining to the service within the client device. In at least some embodiments and in accordance with the foregoing, if a particular user, e.g., user A is using user A's client device in conjunction with user B's device manager, then the information is stored in user A's client device. This allows user A's client device to push the stored information from user A's client device to user A's device manager after establishing a connection with user A's device manager. The stored information is transferred to the service owner of the primary client device network. If user A is using user B's client device in conjunction with user A's device manager, then the information is stored in user A's device manager. This allows user A's device manager to push the stored information to user A's client device that owns this service after establishing a connection to user A's client device.

If the communication is between a primary device manager and a secondary client device, then the primary device manager takes temporary ownership of the service and stores the information pertaining to the service in the primary device manager. The stored information is transferred to the service owner of the primary device manager's network, e.g., the primary device manager or another designated client device in the PDN of the primary device manager as specified, for example, by user preferences and/or network or device preferences.

Further, it there is a primary device type (either client device or device manager) to a secondary device type (either client device or device manager) communication, the information in both the devices is protected and controlled by user settings, e.g., a secondary client device can not browse an address book or SMS history of a primary device manager without required permissions from the device manager. In at least some embodiments, a distributed memory scheme is used, e.g., certain portions of memory are masked if communication occurs with a secondary device.

If a single entity, i.e., person, has multiple device managers, then client devices either specify which device manager to use or are chosen automatically based on criteria including time of day, location, etc.

If a single entity has multiple device managers, then services are assigned based on a preference, e.g., user preference or network preference, to a particular device manager.

Wireless Network

Wireless network 102 comprises a wireless communication system transporting communication between wireless device 104 and device manager 106. Additionally, wireless network 102 transports communication with wired or other wireless networks. In at least some embodiments, wireless network 102 transports communication to/from one or more packet-switched wired and/or wireless networks such as the Internet. Wireless network 102, in at least some embodiments, includes wireless service operators providing wireless connectivity between wireless device 104 and other wireless devices connected with wireless network 102.

In at least some embodiments, wireless network 102 comprises a cellular communication network, e.g., a code division multiple access (CDMA) based, a time division multiple access (TDMA) based, a global system for mobile (GSM) based, a worldwide interoperability for microwave access (WIMAX) based, 1xEV-Data Optimized (1xEV-DO), 1×EV-Data Voice (1xEV-DV), Universal Mobile Telecommunication System (UMTS), Wideband CDMA (WCDMA), General Packet Radio Service (GPRS), a wireless local area network (WLAN), or other wide area wireless network protocol.

Wireless network 102 stores identifying information related to wireless device 104 and device manager 106. In at least some embodiments, wireless network 102 stores service information related to wireless device 104 and device manager 106. In at least some embodiments, wireless network 102 stores identifying information related to a user of each of wireless device 104 and device manager 106.

Legacy Wireless Device

Wireless device 104 (also referred to as legacy wireless device) includes portable wireless computing devices, e.g., portable wireless telephones, personal digital assistants (PDAs) and paging devices, which are small, lightweight, and easily carried by users. More specifically, the portable wireless telephones, for example, further include cellular telephones that communicate voice and data packets over wireless networks, e.g., wireless network 102.

Device Manager High Level

Device manager 106 is a processing-based device for managing one or more client devices in communication with the device manager and the communication of the client devices with wireless network 102. In at least some embodiments, device manager 106 is a user-transportable device configured to manage communication with, and communicate with, wireless network 102. In at least some embodiments, device manager 106 is small enough to be carried in one hand of a user or in a pocket of a user.

In at least some embodiments, device manager 106 receives the registration of client devices and elements of the client devices and/or new services defined by at least one of the client devices. For example, in at least some embodiments, a voice service provided to device manager 106 from wireless network 102 may comprise two components: a voice path for transmission of an audio signal and a caller identifier (ID) information to identify a caller to a user. In accordance with the foregoing example, an embodiment of device manager 106 is able to direct the components of the voice service to one or more elements of one or more client devices. In at least some further embodiments, the new services registered are defined based on capabilities of the device manager.

In at least some embodiments, device manager 106 is configured to control client devices for administrative purposes, e.g., initial registration, configuration, preference management, adding/removing client devices, etc. In at least some embodiments, the protocol for communication between a client device and device manager 106 comprises a capability for the device manager to control at least a portion of user functionality of the client device. In at least some embodiments, the protocol for communication between a client device and device manager 106 comprises a capability for the device manager to control at least all user functionality of the client device. In at least some embodiments, a client device, and in particular the user interface of the client device, is used for administrative control of device manager 106

In at least some embodiments, device manager 106 stores information related to hardware and/or software capabilities of one or more client devices. In at least some further embodiments, device manager 106 stores the information related to capabilities to one or more client devices. In at least some other embodiments, device manager 106 shares the information related to capabilities with one or more client devices and/or one or more other device managers.

In at least some embodiments, device manager 106 manages a client device based on one or more user-defined parameters. In at least some embodiments, device manager 106 determines a policy management service with respect to client devices based on one or more user-defined parameters.

In at least some embodiments, device manager 106 selects from among different services provided by one or more client devices based on which client devices are active and/or based on one or more user-defined parameters.

In at least some embodiments, device manager 106 stores and/or manages information related to communication subscription information. For example, a wireless device may be subscribed to a particular communication service or set of services provided by a particular wireless carrier, e.g., wireless network. The particular wireless device subscription information is stored by device manager 106. In at least some embodiments, device manager 106 manages whether one or another of a particular wireless device subscription is active. In at least some embodiments, user subscription information, similar to wireless device subscription information, may be stored and/or managed by device manager 106.

In at least some embodiments, device manager 106 may store and manage subscription information related to a single user having two subscriptions, e.g., related to a home or personal subscription and to a business or office subscription. In at least some other embodiments, device manager 106 may store and manage subscription information related to client devices registered with the device manager. In at least some embodiments, a single client device may be in communication with more than one device manager 106 during overlapping and/or non-overlapping time periods. In such a scenario, device manager 106 controls the services and information (and storage thereof) with respect to the client device.

In at least some embodiments, device manager 106 stores and manages a wake up schedule for connected client devices. For example, if a particular service provided by a client device comprises a metering application, device manager 106 may cause the client device to wake up at least once per week in order to obtain the metering data.

Client Devices High Level

Client devices (108, 110, 112, 114, 116) communicate with device manager 106 using a predetermined protocol during the time period in which the client devices are within predetermined range 118 of the device manager. In at least some embodiments, the client devices provide overlapping and/or non-overlapping functionality to device manager 106. In at least some embodiments, the client devices are small enough to be carried in one hand of a user or in the pocket of a user. In at least some embodiments, each client device is carried on a person also carrying device manager 106 with which each client device is in communication.

In at least some embodiments, predetermined range 118 comprises a distance of from a meter or two to a few meters, e.g., 1-10 meters, depending on the particular communication mechanism used. In at least some embodiments, an optical, radio frequency, or magnetic-based communication mechanism may be used for near-field communications (NFC) such as BLUETOOTH, RFID, etc. In at least some embodiments, predetermined range 118 comprises an exclusively NFC-based range.

In at least some embodiments, predetermined range 118 comprises a distance greater than and/or different from that associated with NFC described above, e.g., greater than a few meters. In accordance with such embodiments, a wireless communication mechanism, e.g., optical, radio frequency, or magnetic-based communication mechanism, such as wireless networking, e.g., WIFI, may be used for communication between device manager 106 and the client devices. In accordance with such embodiments, client devices may be in communication (and determined to be within predetermined range 118) if the client devices are within a network reachable range of device manager. For example, a client device may be in communication with device manager 106 via a network, e.g., wireless local area network (WLAN), connection.

As described above, an exemplary set of client devices comprises a monitor device 108, a tablet-based device 110, a wireless device 112, a touch-screen based wireless device 114, and a positioning device 116. Client devices may comprise devices having only user input, only output, e.g., display, or a combination thereof. Other functionality and type of client devices are within the scope of one or more embodiments of the present invention. In at least some embodiments, client devices communicate with other client devices, wireless network 102, and/or wireless device 104 via device manager 106.

As an exemplary client device, monitor device 108 is a heart-rate monitor for monitoring the rate at which the heart of a user beats. The heart beat rate information is displayed on a display of monitor device 108 and transmitted to device manager 106. In at least some embodiments, monitor device 108 does not include a display and solely transmits the heart beat rate information to device manager 106. In such an embodiment, device manager 106 applies user-defined preferences to select another client device on which to display and/or store the heart beat rate information. In at least some embodiments, device manager 106 locally stores the received heart beat rate information. In at least some other embodiments, device manager 106 stores the received heart beat rate information in another client device.

In at least some other embodiments, different types of information may be monitored and transmitted to device manager 106. In at least some embodiments, device manager 106 may communicate with monitor device 108 to specify a particular reporting schedule by which the monitor device determines whether and/or at what time to transmit the monitored information.

As an exemplary client device, tablet-based device 110 is a processor-based device such as a tablet computer for receiving commands and input from a user and transmitting information to the user. Tablet-based device 110 comprises a touch or stylus-based input mechanism for receiving input from a user which also at least partially provides the display mechanism for transmitting information to the user. Tablet-based device 110 comprises a communication interface for communicating with device manager 106 during a time period in which the tablet-based device is within predetermined range 118.

As an exemplary client device, wireless device 112 is a wireless device similar to wireless device 104. Wireless device 112 includes portable wireless computing devices, e.g., portable wireless telephones, personal digital assistants (PDAs) and paging devices, which are small, lightweight, and easily carried by users. More specifically, the portable wireless telephones, for example, further include cellular telephones that communicate voice and data packets over wireless networks, e.g., wireless network 102.

In particular, wireless device 112 communicates voice and data packets over wireless network 102 via communication of the packets using device manager 106. In at least some embodiments, wireless device 112 communicates voice and data packets during a time period in which wireless device is within predetermined range 118. In at least some further embodiments, wireless device 112 communicates voice and data packets over wireless network 102 without device manager 106 during a time period in which wireless device is outside predetermined range 118.

As an exemplary client device, touch-screen based wireless device 114 is a wireless device similar to wireless device 112. Touch-screen based wireless device 114 comprises a touch-screen interface similar to tablet-based device 110.

As an exemplary client device, positioning device 116 is a positioning and/or navigation device which receives positioning signals, e.g., from a global positioning system (GPS) or other signal-based system, transmitted from satellites or ground stations in order to calculate a position of the device with respect to the transmitting system. Positioning device 116 communicates voice and/or data packets over wireless network 102 via device manager 106. For example, In at least some embodiments, positioning device 116 may comprise a communication interface and functionality enabling use of the positioning device as a user input/output device for telephonic communication, e.g., by providing a speakerphone capability. In at least some other embodiments, positioning device 116 displays information related to a current or expected location of the positioning device based on retrieved information from wireless network 102 via device manager 106. In at least some embodiments, positioning device 116 is able to make and receive audio communications via providing a user interface and communication path to device manager 106.

In at least some embodiments, device manager 106 classifies one or more client devices, e.g., according to capabilities such as hardware and/or service functionalities of the client device, i.e., H/W attribute set and/or service attribute set, and maintains a data store of each client device capability, e.g., in a database.

Client Devices Details

Figure 4:
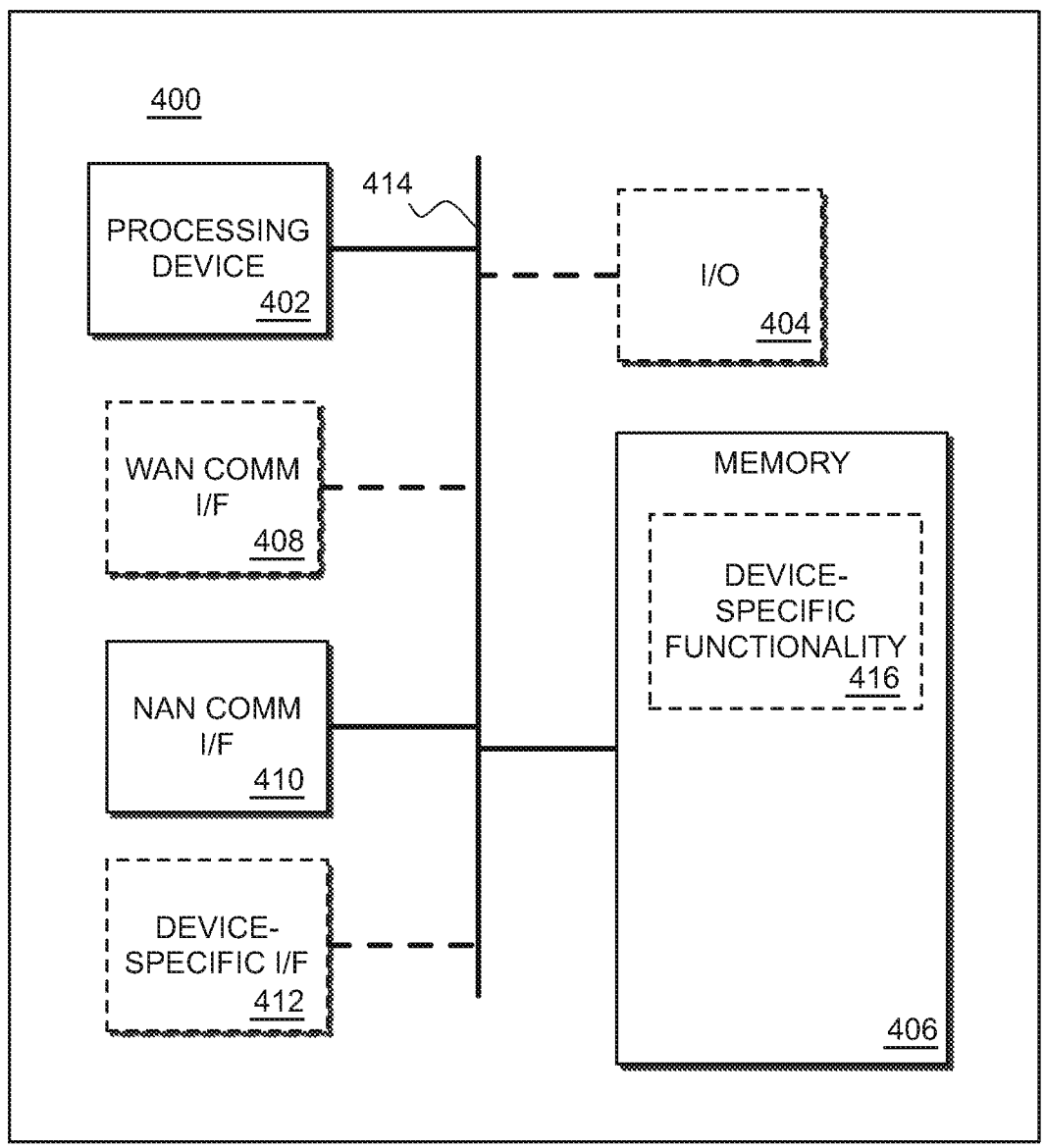
FIG. 4 is a high-level functional block diagram of a client device according to an embodiment.

FIG. 4 depicts a high-level functional block diagram of a client device 400 according to an embodiment. In at least some embodiments, one or more of the client devices (FIG. 1) may be arranged according to client device 400.

Client device 400 comprises a processing device 402, an (optional) input/output (I/O) device 404, a memory 406, an optional wide area network (WAN) communication interface (I/F) 408, a near area network (NAN) communication I/F 410, and an optional device-specific I/F 412 each communicatively coupled with a bus 412. Processing device 402 comprises a processor, application specific integrated circuit (ASIC), or other instruction executing/interpreting hardware-based system. In at least some embodiments, processing device 402 may comprise a virtual or software-based instruction executing system.

Optional I/O device 404 is coupled to bus 414 and may comprise an input device, an output device and/or a combined input/output device for enabling user interaction. An input device may comprise, for example, a keyboard, keypad, mouse, trackball, trackpad, and/or cursor direction keys for communicating information and commands to processing device 402. An output device may comprise, for example, a display, a printer, a voice synthesizer, a light, etc. for communicating information to a user. In at least some embodiments, I/O device 404 may comprise a serial and/or parallel connection mechanism for enabling the transfer of one or more of files and/or commands.

Memory 406 (also referred to as a computer-readable medium or computer-readable memory) is coupled to bus 414 for storing data and/or information and instructions to be executed by processing device 402. Memory 406 also may be used for storing temporary variables or other intermediate information during execution of instructions to be executed by processing device 402. Memory 406 may also comprise a read only memory (ROM) or other static storage device coupled to bus 414 for storing static information and instructions for processing device 402. Memory may comprise static and/or dynamic devices for storage, e.g., optical, magnetic, and/or electronic media and/or a combination thereof.

In at least some embodiments, memory 406 comprises a set of instructions for execution by processing device 402 which, when executed by the processing device, cause client device 400 to perform one or more specific functionalities embodied in device-specific functionality 416. For example, a particular client device such as a tablet-based device 110 may comprise a handwriting recognition functionality. In at least some embodiments, device-specific functionality 416 comprises one or more services executed by client device 400 and made available for use to device manager 106.

In at least some embodiments, client device 400 comprises a separate storage device as described above.

Optional WAN communication I/F 408 is coupled to bus 414 and communicates data and/or voice packets with wireless network 102 (FIG. 1) during a time period in which client device 400 is outside predetermined range 118. In at least some embodiments, WAN communication I/F 408 is a cellular communication interface, a high speed data network interface, or other data and/or voice network interface.

NAN communication I/F 410 is coupled to bus 414 and communicates data and/or voice packets with one or more of the client devices within predetermined range 118 (FIG. 1). In at least some embodiments, NAN communication I/F 410 is a near field communication mechanism, e.g., an optical, radio frequency, or magnetic-based communication mechanism usable for communication within a predetermined range 118 (FIG. 1). Exemplary mechanisms comprise BLUETOOTH, WIFI, RFID, etc.

Client device 400 also comprises, in at least some embodiments, an optional device-specific I/F 412. In at least some embodiments, device-specific I/F 412 may be a device-specific module directly connected with bus 414. For example, monitor device 108 such as a heart-rate monitor type device comprises a device-specific I/F (or module) 412 for monitoring the heart rate of a user wearing the device, e.g., via a contact-based pulse detecting system.

Two Part Aspect Based on Device Manager

In at least one embodiment, device manager 106 stores user and/or device-based subscription information for enabling the communication of data and/or voice packets with wireless network 102. In at least some embodiments, device manager 106 is the sole storage location for such user and/or device-based subscription information. In such a device manager-based subscription information storage embodiment, client devices are able to access services provided by wireless network 102 solely via device manager 106.

In at least some embodiments, device manager 106 is a separate device from the client devices and, in particular, wireless devices such as wireless device 112 and touch-screen based wireless device 114, and provides the sole manner of enabling communication between the client devices and wireless network 102.

In at least some embodiments, the functionality described herein with respect to device manager 200 may be incorporated into a single device such as wireless device 104, 112, 114.

Device Manager Low Level

Figure 2:
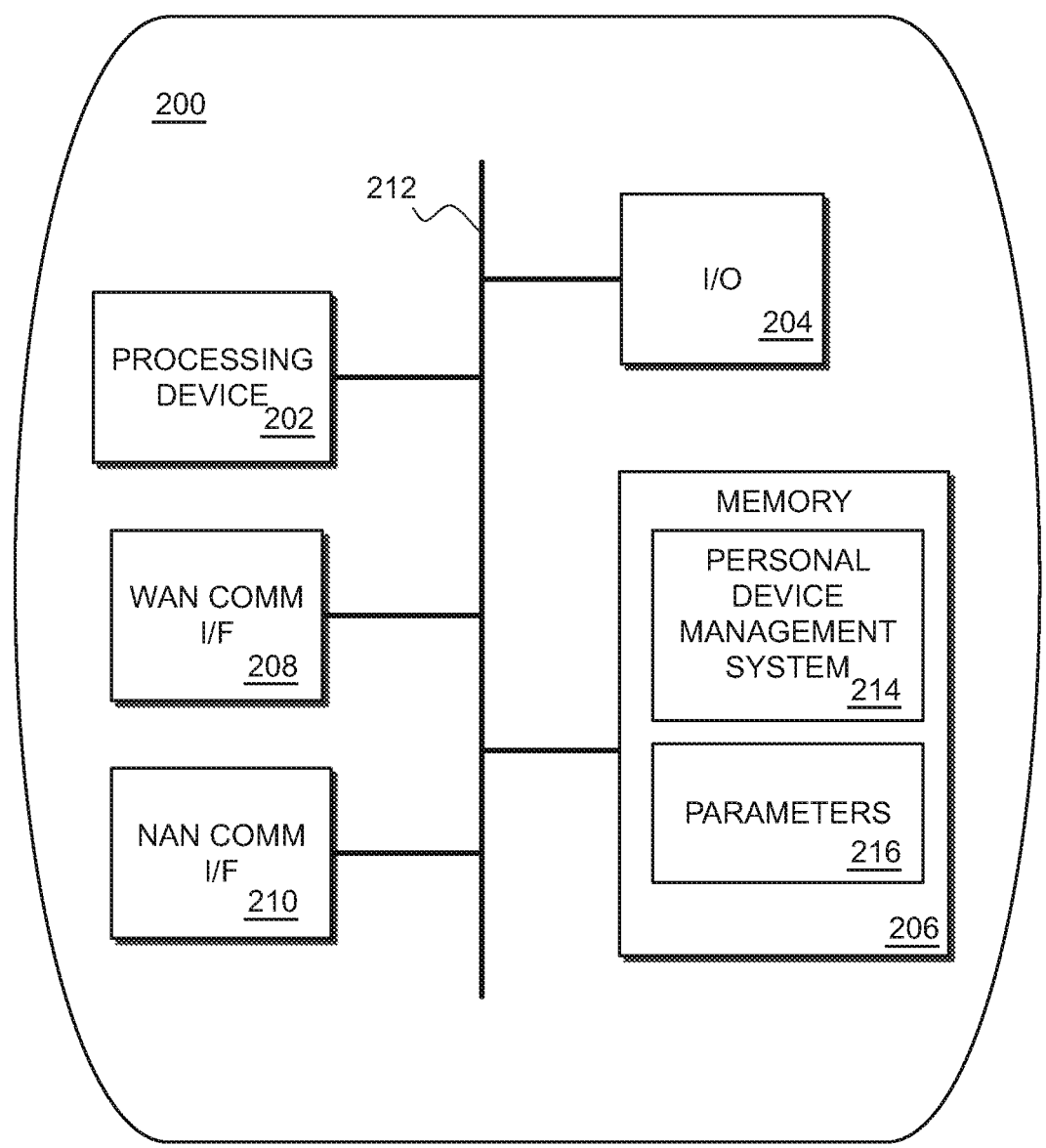
FIG. 2 is a high-level functional block diagram of a device manager according to an embodiment.

FIG. 2 depicts a high-level functional block diagram of a device manager 200 according to an embodiment. In at least some embodiments, device manager 106 (FIG. 1) may be arranged according to device manager 200.

Device manager 200 comprises a processing device 202, an input/output (I/O) device 204, a memory 206, a wide area network (WAN) communication interface (I/F) 208, and a near area network (NAN) communication I/F 210 each communicatively coupled with a bus 212. Processing device 202 comprises a processor, application specific integrated circuit (ASIC), or other instruction executing/interpreting hardware-based system. In at least some embodiments, processing device 202 may comprise a virtual or software-based instruction executing system.

I/O device 204 is coupled to bus 212 and may comprise an input device, an output device and/or a combined input/output device for enabling user interaction. An input device may comprise, for example, a keyboard, keypad, mouse, trackball, trackpad, and/or cursor direction keys for communicating information and commands to processing device 202. An output device may comprise, for example, a display, a printer, a voice synthesizer, a light, etc. for communicating information to a user. In at least some embodiments, I/O device 204 may comprise a serial and/or a parallel connection mechanism for enabling the transfer of one or more of files and/or commands.

Figure 3:
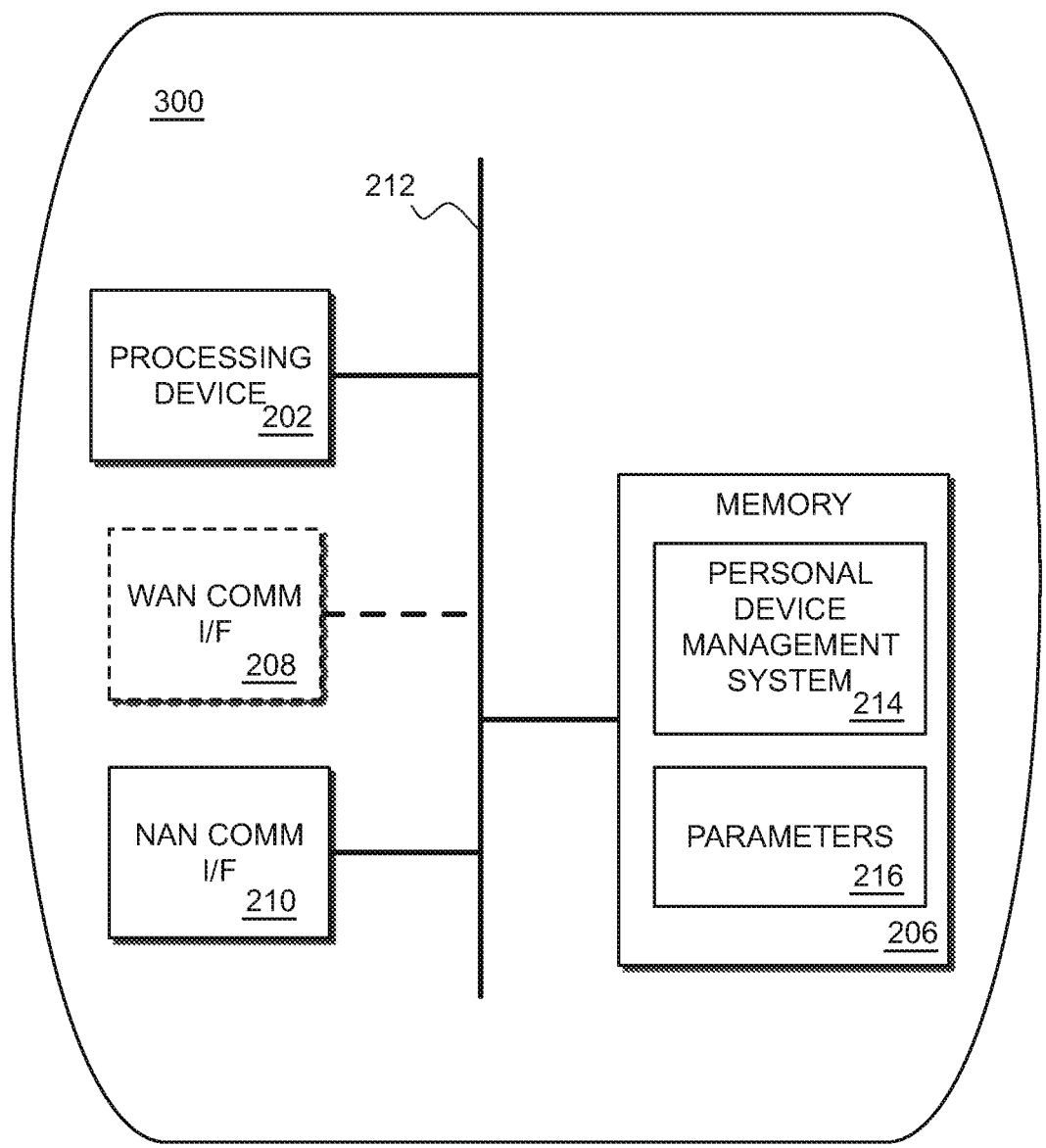
FIG. 3 is a high-level functional block diagram of a device manager according to another embodiment.

FIG. 3 depicts device manager 106 according to another embodiment 300 in which I/O device 204 is excluded from the device manager. Further, according to at least one embodiment, WAN communication I/F 208 is optional (as indicated by dashed line representation) and may be excluded from device manager 106. In accordance with at least one such embodiment, one or more client devices may comprise WAN communication I/F 208 under control of device manager 106. For example, access to and operation of WAN communication I/F 208 as part of a client device may be managed by device manager 106 as a service and/or service component.

Returning to FIG. 2, memory 206 (also referred to as a computer-readable medium or computer-readable memory) is coupled to bus 212 for storing data and information, e.g., parameters comprising predefined parameters and user-defined parameters, and instructions to be executed by processing device 202. Memory 206 also may be used for storing temporary variables or other intermediate information during execution of instructions to be executed by processing device 202. Memory 206 may also comprise a read only memory (ROM) or other static storage device coupled to bus 212 for storing static information and instructions for processing device 202. Memory may comprise static and/or dynamic devices for storage, e.g., optical, magnetic, and/or electronic media and/or a combination thereof.

In at least some embodiments, device manager 200 comprises a separate static storage device as described above.

WAN communication I/F 208 is coupled to bus 212 and communicates data and/or voice packets with wireless network 102 (FIG. 1). In at least some embodiments, WAN communication I/F 208 is a cellular communication interface, a high speed data network interface, or other data and/or voice network interface.

NAN communication I/F 210 is coupled to bus 212 and communicates data and/or voice packets with one or more of the client devices within predetermined range 118 (FIG. 1). In at least some embodiments, NAN communication I/F 210 is a near field communication mechanism, e.g., an optical, radio frequency, or magnetic-based communication mechanism usable for communication within a predetermined range 118 (FIG. 1). Exemplary mechanisms comprise BLUETOOTH, WIFI, RFID, etc.

Memory Detail

Memory 206 comprises one or more sets of instructions which, when executed by processing device 202, cause the processing device to perform one or more steps of functionality. Memory 206 comprises a set of executable instructions comprising a personal device management system 214 and a set of parameters 216, e.g., user-defined and/or predefined parameters for access and modification by PDMS 214.

Personal Device Management System Details

Figure 5:
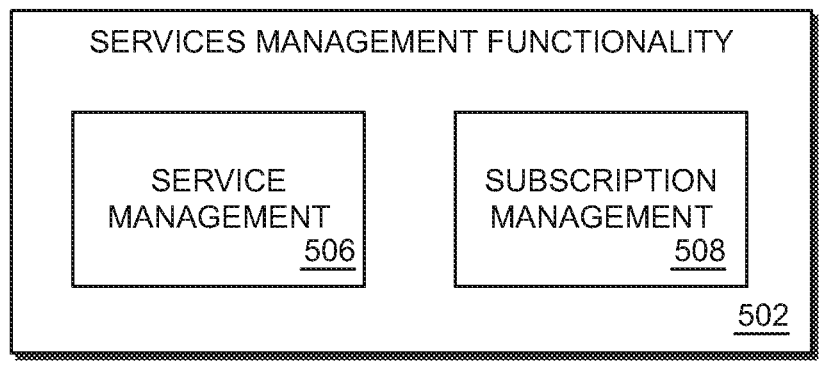
FIG. 5 is a high-level functional block diagram of at least a portion of a personal device management system according to an embodiment.
Figure 5:
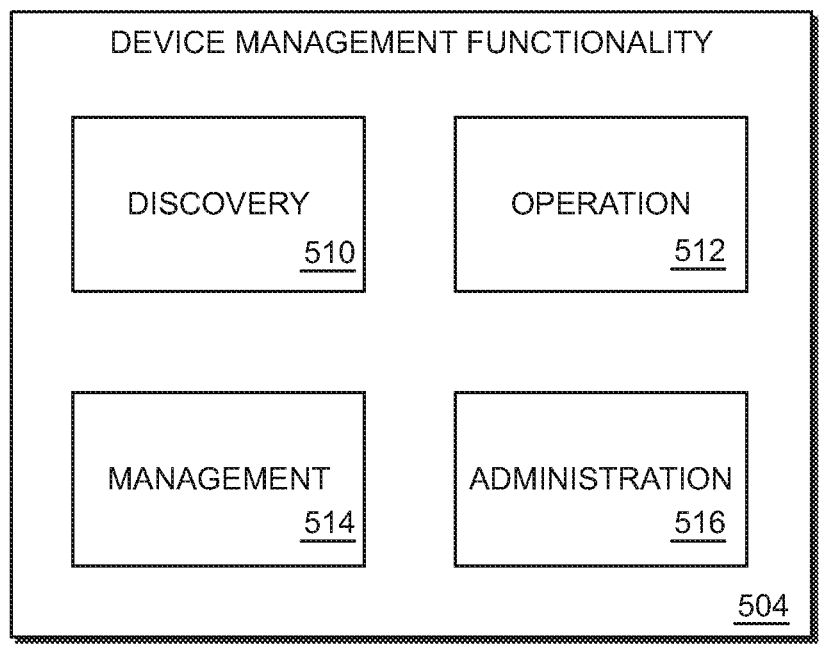

FIG. 5 depicts a high-level functional block diagram of at least a portion 500 of a personal device management system 214 according to an embodiment. Portion 500 of PDMS 214 comprises a set of services management functionality 502 and a set of device management functionality 504.

Services management functionality 502 comprises at least a service management module 506 and a subscription management module 508. Services management functionality 502 comprises functionality which, when executed by processing device 202, causes the processing device to perform one or more operations at a device manager level and/or in communication with wireless network 102.

Device management functionality 504 comprises at least a discovery module 510, an operation module 512, a management module 514, and a administration module 516. Device management functionality 504 comprises functionality which, when executed by processing device 202, causes the processing device to perform one or more operations in communication with one or more client devices. In at least some embodiments, device management functionality 504 may comprise performing operations in communication with one or more client devices and wireless network 102.

Services Management Functionality of Device Manager

Service management module 506 comprises a set of instructions for defining and interacting with one or more client devices regarding the set of services that device manager 200 may perform with respect to a wireless network 102 and/or a client device.

Subscription management module 508 comprises a set of instructions for managing the user and/or device-based subscription with respect to wireless network 102. In at least one embodiment, device manager 200 may store more than one subscription with respect to one or more wireless networks 102 and execution of subscription management module 508 causes the device manager to determine which subscription(s) are active at a particular time. In at least some embodiments, the determination of which subscription(s) are active is determined based on at least one or more parameters stored in parameters 216 (FIG. 2) of memory 206.

Device Management Functionality of Device Manager

Discovery module 510 comprises a set of instructions for discovering a client device after the client device is moved within predetermined range 118 with respect to device manager 200.

Operation module 512 comprises a set of instructions for registering a client device with device manager 200. Operation module 512 receives a set of client device-dependent attributes and capabilities for storage in memory 206. Operation module 512 also enables a client device to register a new set of services, at least in some embodiments, in conjunction with a set of capabilities of device manager 200. For example, operation module comprises a set of instructions for receiving and storing hardware and/or software capability information received from one or more client devices.

Management module 514 comprises a set of instructions for managing the communication of data and/or voice packets to/from one or more client devices based on one or more parameters 216 stored in memory 206. In at least some embodiments, the one or more parameters 216 comprise user-defined and/or predefined parameters. In at least some embodiments, management module 514 enables device manager 200 to control a client device, and in at least some embodiments, the device manager controls operation of a client device to the exclusion of user interaction with the client device.

In at least some embodiments, management module 514 arbitrates services for provision among more than one client device. For example, depending on the capability of particular client devices connected with device manager 200, the device manager via execution of management module 514 determines which services are provided to which client devices. In at least some embodiments, management module 514 arbitrates among more than one client device depending on which client devices are active and positioned within predetermined range 118.

Administration module 516 comprises a set of instructions for terminating use of a particular client device. In at least some embodiments, a client device may store/be used to store data and/or information as a result of user use of the client device or as a result of device manager communication with the client device, e.g., downloading of contact information. In order to prevent unauthorized access to the stored information, administration module 516 enables device manager 200 to access the client device and remove stored information based on at least one of user indication of non-use of the device or a predetermined expiration time stored in parameters 216 of memory 206.

Flowcharts/Message Sequence Charts

Figure 6:
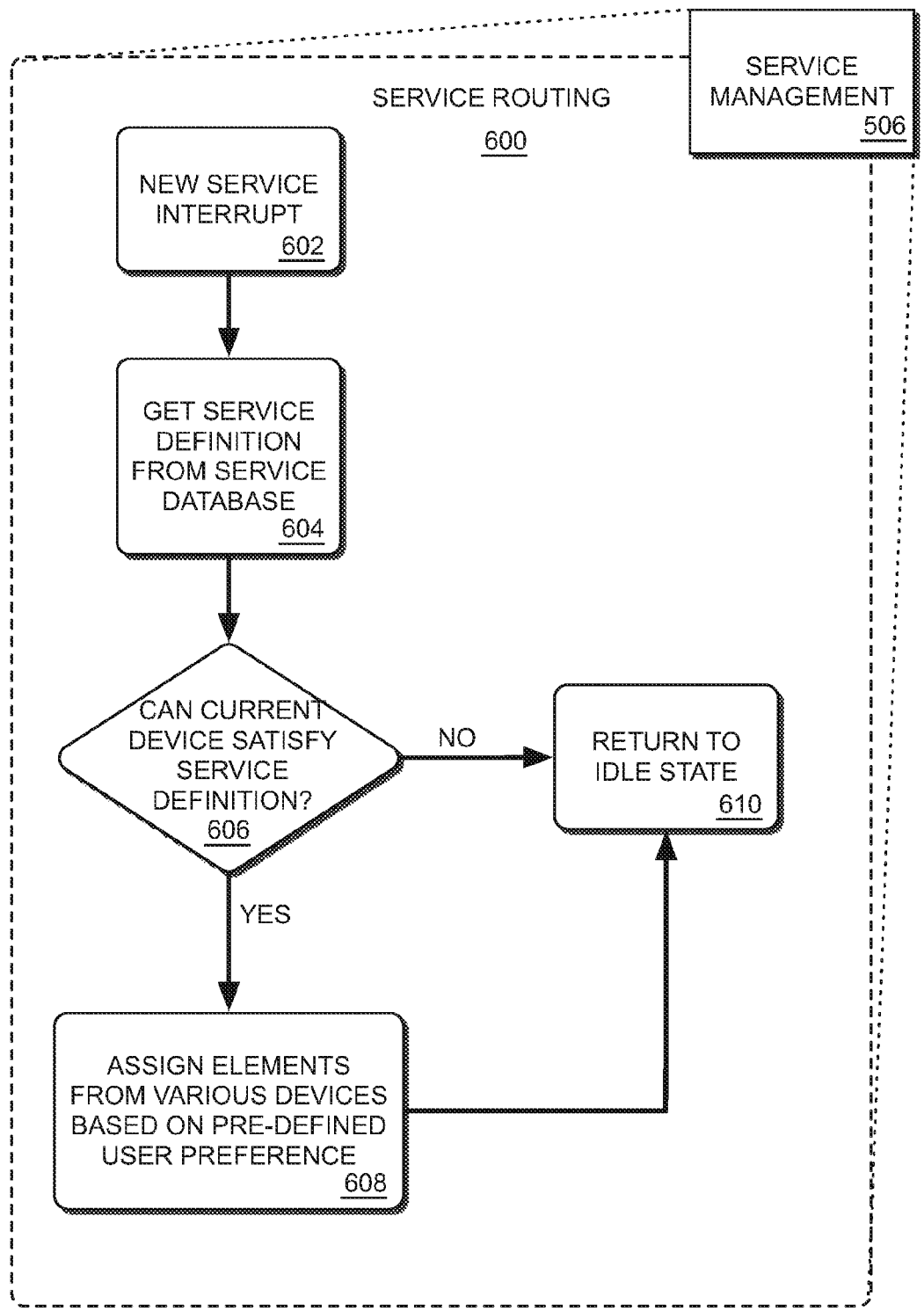
FIG. 6 is a high-level process flow diagram of a service routing method of a service management module according to an embodiment.

FIG. 6 depicts a high-level process flow diagram of operation of at least a portion of a service routing method 600 of discovery module 510 according to an embodiment. Service routing method 600 comprises a set of instructions which, when executed by processing device 202, cause the processing device to perform a particular set of functionality.

The flow begins at functionality 602 wherein a new service interrupt is received by device manager 106. Device manager 106 receives the service interrupt from wireless network 102, e.g., the wireless network transmits information to the device manager according to a particular service to which a user of the device manager may be subscribed. The flow proceeds to functionality 604.

Responsive to receipt of the new service interrupt by device manager 106, the device manager retrieves the service definition corresponding to the perceived service interrupt. In at least some embodiments, device manager 106 retrieves the service definition from a service definition database stored in memory 206. The retrieved service definition specifies a set of attributes, i.e. hardware attributes set and/or service attribute set, of a client device needed to be able to handle the received service. In at least some embodiments, the received service interrupt comprises the service definition within the interrupt.

If a corresponding service definition does not exist, the service routing method 600 ends and/or returns to an idle state awaiting a new service interrupt. If the corresponding service definition exists, the flow proceeds to functionality 606.

During execution of functionality 606, device manager 106 determines whether there is a current client device able to satisfy the identified service definition corresponding to the received service interrupt. That is, device manager 106 determines whether a client device within predetermined region 118 comprises a hardware attribute set and/or a service attribute set meeting the specified needs of the service definition. If the result of functionality 606 is positive ("YES"), the flow proceeds to functionality 608 wherein device manager 106 assigns elements from at least one device to satisfy the service definition. In at least some embodiments, device manager 106 assigns one or more of hardware and/or service attributes of a particular client device to receive at least a portion of the service corresponding to the received service interrupt. And at least some embodiments, device manager 106 assigns elements based on predefined user preferences regarding client devices and/or services. In at least some embodiments, the predefined user preferences are stored in memory 206.

The flow then proceeds to functionality 610 and the service routing methods 600 ends and/or returns to an idle state awaiting a new service interrupt.

If the result of functionality 606 is negative ("NO"), the flow proceeds to functionality 610 and the service routing method 600 ends and/or returns to an idle state awaiting a new service interrupt.

Figure 7:
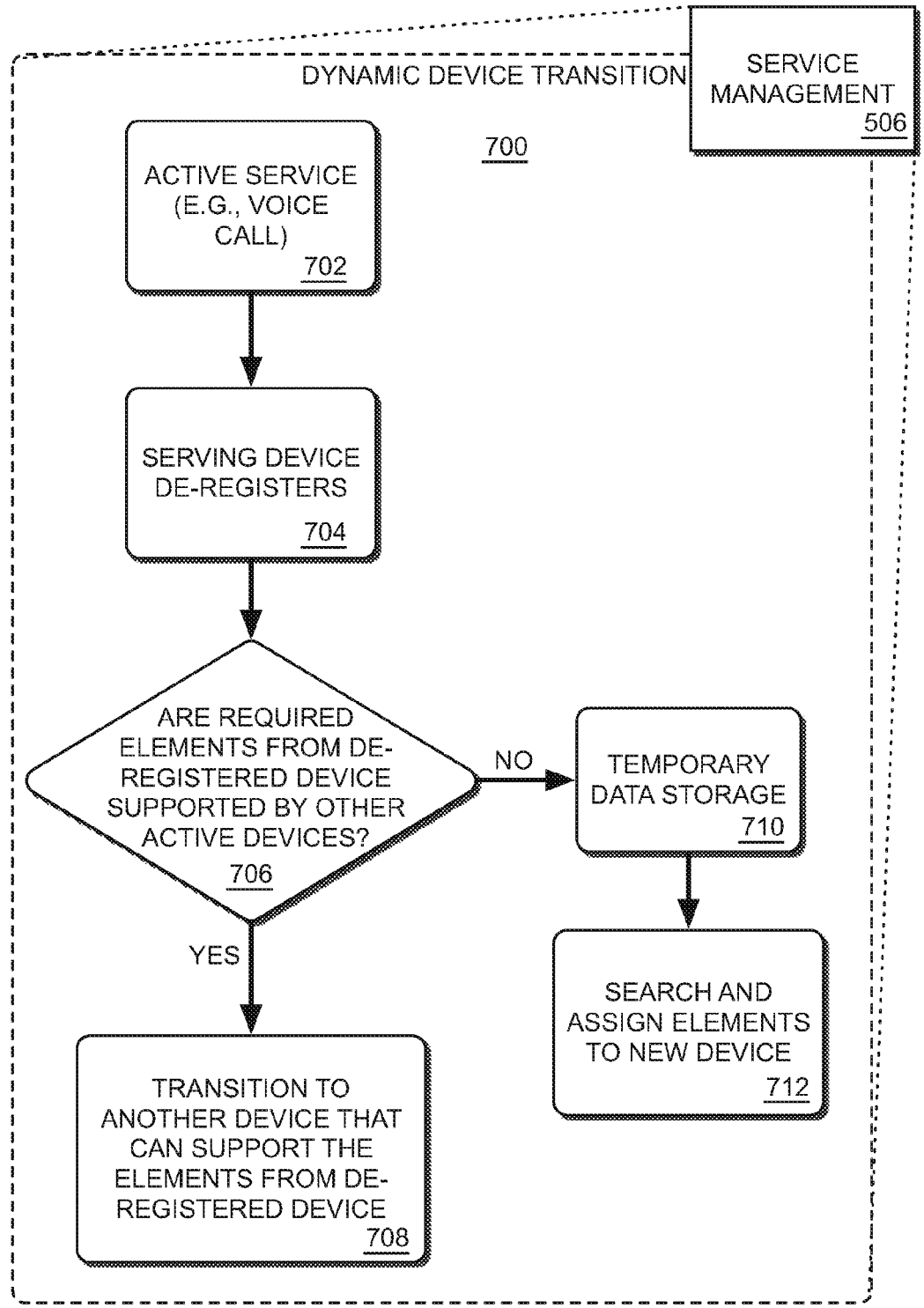
FIG. 7 is a high-level process flow diagram of a dynamic device transition method of a service management module according to an embodiment.

FIG. 7 depicts a high-level process flow diagram of operation of at least a portion of a dynamic device transition method 700 of service management module 506 according to an embodiment. Dynamic device transition method 700 comprises a set of instructions which, when executed by processing device 202, cause the processing device to perform a particular set of functionality.

The flow begins at functionality 702 wherein a particular service is being handled by device manager 106 in conjunction with at least one client device (referred to in this example as the first client device). For example, device manager 106 in conjunction with wireless device 112 is handling a particular service, e.g., a voice call from wireless network 102. That is, device manager 106 is communicating voice packets between wireless device 112 and wireless network 102 in order to enable user using the wireless device to talk with another user via the wireless network. In at least some embodiments, device manager 106 may be handling the service in conjunction with more than one client device. Further, in at least some other embodiments, device manager 106 may allocate portions of the service between more than one client device.

The flow proceeds to functionality 704 responsive to the first client device de-registering from use by device manager 106. For example, the first client device may be powered off, assigned to another service, and/or removed from communication with device manager 106. During execution of functionality 704, device manager 106 removes the first client device from assignment with the particular service. The flow then proceeds to functionality 706.

During execution of functionality 706, device manager 106 determines whether the required elements from the de-registered device are supported by other active devices, i.e., whether another client device comprises the necessary hardware and/or service attribute set to handle the service. In at least some embodiments, device manager 106 determines whether another client device element, e.g., one or more hardware and/or service attributes of a client device, are able to take over for the de-registered client device by accessing a database, e.g., stored in memory 206 (FIG. 2), which stores client device elements, i.e., hardware and/or service attributes. In at least some embodiments, the database may also store user-defined preferences corresponding to the particular client device and/or client device elements. For example, a particular client device element may be preferred for use by a user with respect to one or more of a hardware and/or service attribute. In the given scenario for example, the user may prefer to use a client device having the largest screen size for a particular service. In another example, the user may prefer to use a client device having better audio input or output capabilities with respect to other client devices. Device manager 106, in at least some embodiments, constantly updates the database with information about the client devices and consults the database to determine if a particular preferred client device or device element is registered and, if so, a service may be routed from an existing device element to the preferred device element.

If the result of functionality 706 is positive ("YES"), the flow proceeds to functionality 708 wherein device manager 106 transitions support of at least a portion of the service previously handled by the first client device. In at least some embodiments, device manager 106 transitions a service from one client device to one other client device. In at least some embodiments, device manager 106 transitions a service from one client device to more than one other client device, e.g., based on one or more predefined user preferences with respect to the service and the one or more client devices determined in functionality 706. The flow then proceeds to end and the determined client device or client devices handle the service.

If the result of functionality 706 is negative ("NO"), the flow proceeds to functionality 710 and device manager 106 stores data from the service intended to be handled by the first client device in memory 206. The flow then proceeds to functionality 712 wherein device manager 106 searches, e.g., via NAN communication I/F 210, within predetermined region 118 for another client device able to handle the service. In at least some embodiments, functionality 712 differs from functionality 706 in that the determination of functionality 706 is performed with respect to client devices which are active and currently in communication with device manager 106 whereas functionality 712 is performed with respect to client devices which are active and not currently in communication with the device manager. If the result of functionality 712 is successful, the flow proceeds to end and the discovered client device or client devices handle the service. If the result of functionality 712 is not successful, the flow proceeds to end and device manager 106 continues to store received data related to the service in memory 206. In at least some embodiments, device manager 106 continues to store received data related to the service until another client device is found.

FIGS. 25-28 depict a service routing scenario between a device manager 2500 in communication with a network 2502 and one or more client devices according to an embodiment. In at least one embodiment, FIGS. 25-28 depict a device manager 2500 managing resources of the device manager and one or more client devices as a common resource pool, e.g., memory, bandwidth, processing, etc. To this end, device manager 2500 manages the memory, bandwidth, processing, and/or user interface capabilities of the client devices.

Figure 25:
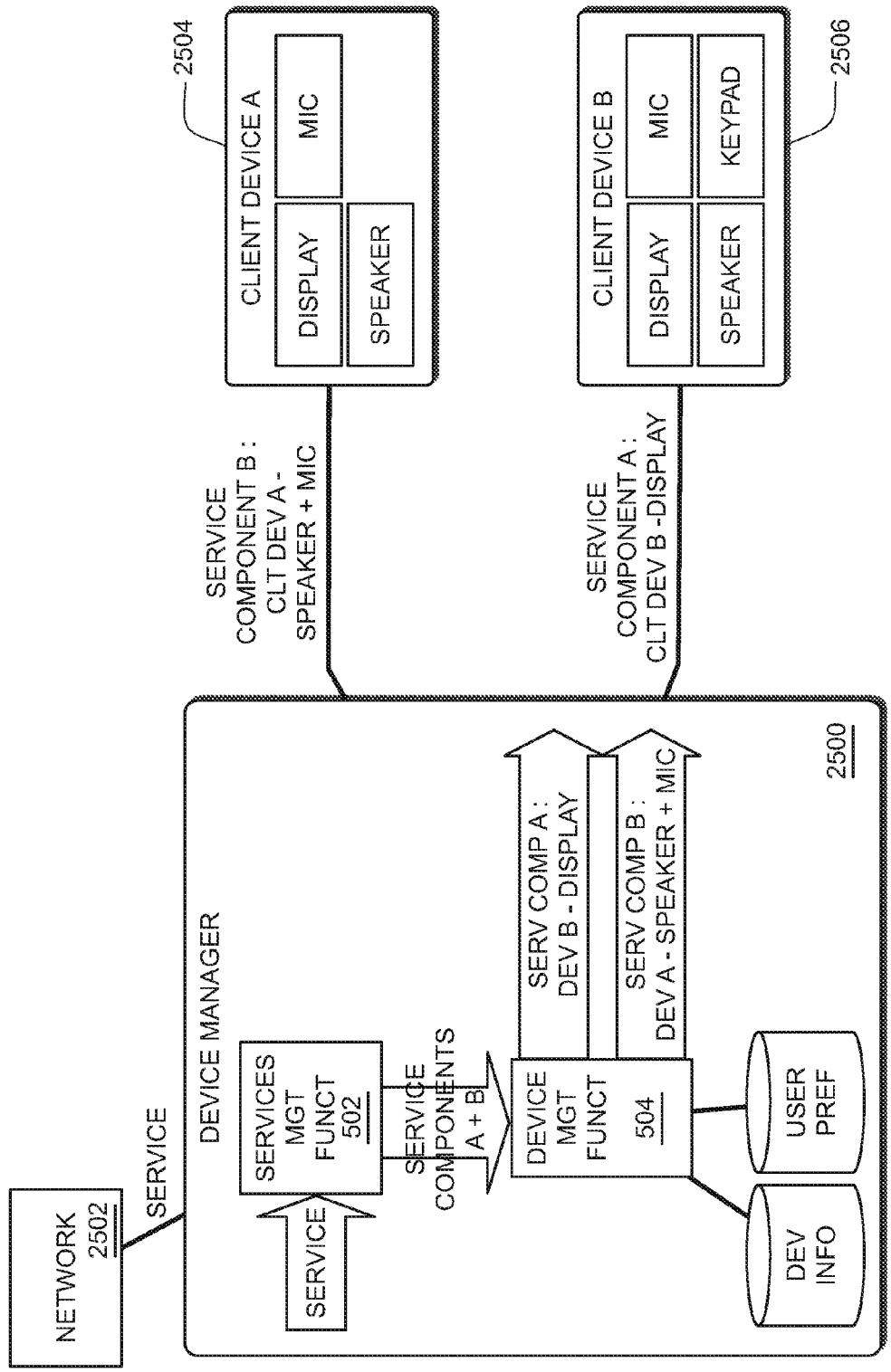
FIG. 25 is a high-level functional block diagram of a device manager communicating with a network and client devices according to an embodiment.

FIG. 25 depicts an initial scenario in which device manager 2500 is communicating with network 2502 in connection with a particular service, e.g., a voice call. Device manager 2500 is also communicating with two client devices, i.e., client device A 2504 and client device B 2506. In accordance with the given scenario, client device A 2504 is a wireless headset, e.g., a BLUETOOTH-based wireless headset, wirelessly communicating with device manager 2500 and client device B 2506 is a mobile telephone handset. Accordingly, client device A 2504 comprises a hardware attribute set comprising a display, a microphone, and a speaker. Client device B 2506 comprises a hardware attribute set comprising a display, a microphone, a speaker, and a keypad capability. Although not depicted in FIG. 25, client device A and client device B both additionally comprise service attribute sets supporting at least the depicted hardware attribute set contents.

The particular service, i.e. the voice call, received from network 2502 comprises two service components, i.e., service component A, e.g., caller identifier (ID) information, and service component B, e.g. a voice path. In accordance with the given scenario, device manager 2500, e.g., based on user preferences and/or client device capabilities, directs service component B of the particular service from network 2502 to client device A 2504, and service component A to client device B 2506. Thus, the wireless headset handles the voice path component and the caller ID information is handled by the handset.

In accordance with at least some embodiments, a service and/or a service component, e.g., service component B (voice path), is assigned to be owned by one or more of device manager and/or client devices, e.g., device manager 2500, client device A 2504, client device B 2506. Device manager 2500 determines which device owns the service or service component based on at least one of user preferences and/or service or service component information. The service owning device is responsible for providing and/or managing memory for storage and a primary user interface for the service. In the example of FIG. 25, client device B 2506 is the service owner for service component B (voice path). At the conclusion of the service component, e.g., termination of the phone call, the service owning device, i.e., client device B 2506, stores call history information in memory, e.g., memory 406 FIG. 4. In at least some embodiments, each service is owned by a single device to the exclusion of other devices.

Figure 26:
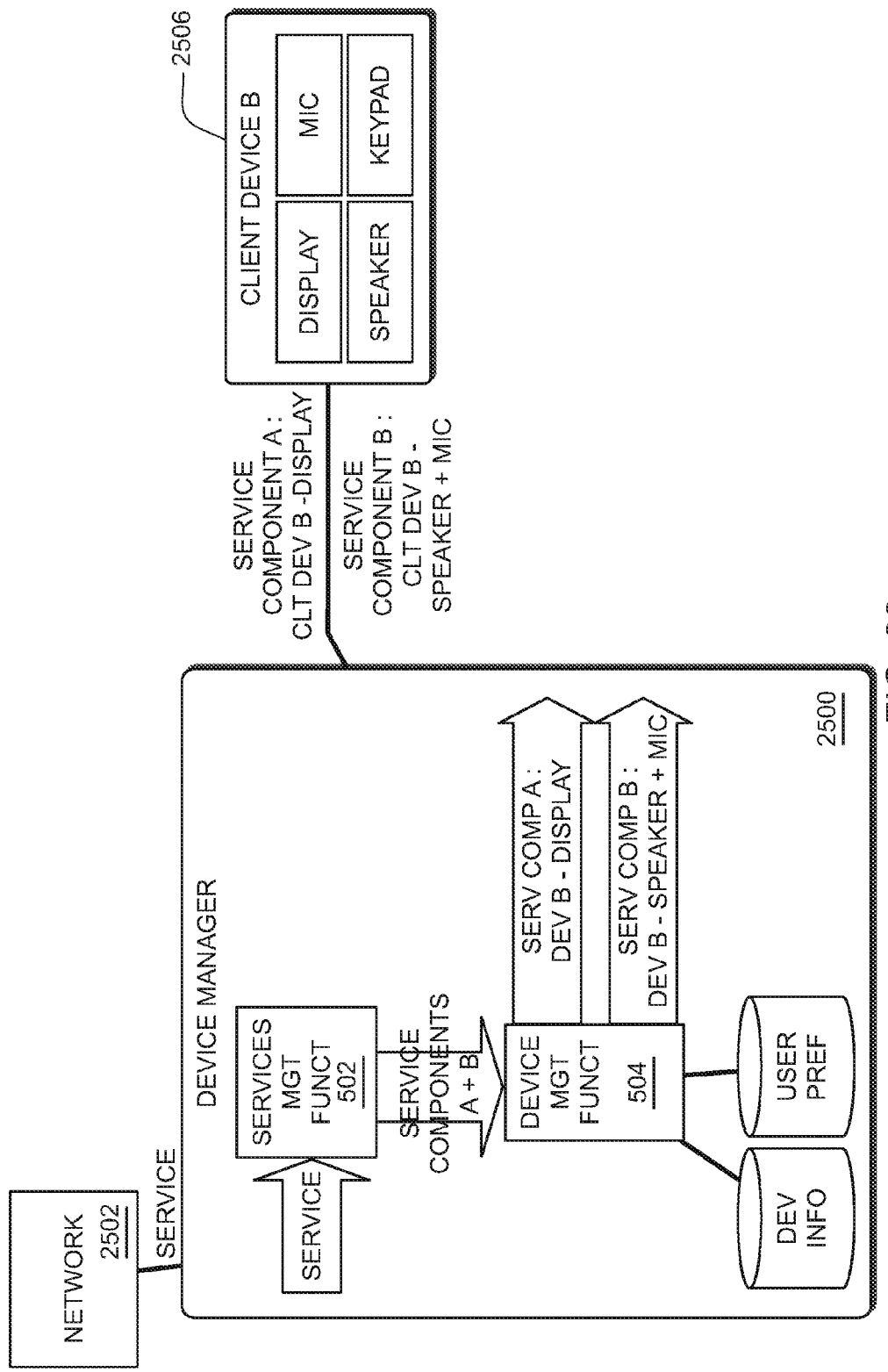
FIG. 26 is a high-level functional block diagram of a device manager communicating with a network and a client device according to an embodiment.

FIG. 26 depicts device manager 2500 communicating with network 2502 at a point later in time for the service initiated in FIG. 25. At the time depicted in FIG. 26, client device A 2504 has either been deactivated or moved outside predetermined region 118 (FIG. 1). Device manager 2500, responsive to a determination of the unavailability of client device A 2504, determines that the remaining client device, i.e. client device B 2506, is able to support all service components of the particular service. The service is continued without interruption by device manager 2500 re-routing service component A and service component B to device elements display and device element speaker+microphone, respectively in client device B 2506.

Figure 27:
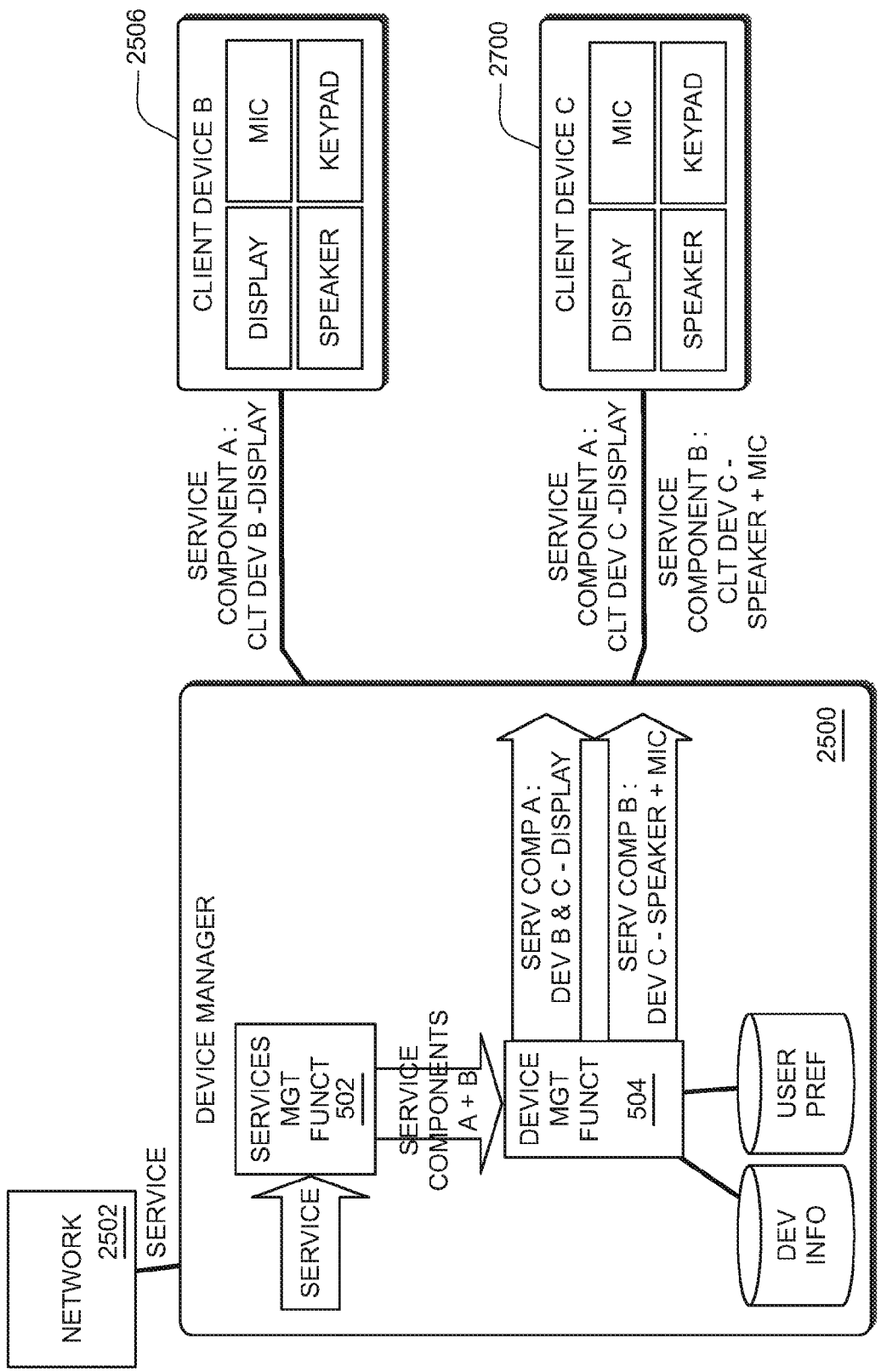
FIG. 27 is a high-level functional block diagram of a device manager communicating with a network and client devices according to an embodiment.

FIG. 27 depicts device manager 2500 communicating with network 2502 at a point later in time with respect to FIG. 26. In at least some embodiments, FIG. 27 may depict a point later in time with respect to FIG. 25, i.e., FIG. 27 may occur without intervening FIG. 26. At the time depicted in FIG. 27, a new client device C 2700 has either been activated or moved within predetermined region 118 (FIG. 1) and the hardware attribute set and service attribute set made available to device manager 2500. Client device C 2700 comprises a display, a microphone, a keypad, and a speaker, e.g., a home-based telephone handset with wireless capability, e.g., a BLUETOOTH-based handset. Responsive to a determination of the availability of client device C 2700 and the corresponding hardware and service capabilities of the client device, device manager 2500 determines that the new client device is able to support all service components of the particular service. In accordance with one or more user preferences and/or system parameters 216 (FIG. 2), device manager 2500 transitions the handling of a particular service, i.e. both service component A and service component B, to client device C 2700. For example, if a user using a handset such as client device B 2506 arrives home, the user may prefer (e.g., for reasons related to ergonomics, style, functionality, etc.) to continue current and/or future voice communications using the home handset. In at least the depicted embodiment, device manager 2500 continues communication of service component A with client device B 2506, e.g., in order that the user continue to understand that the call remains the same based on the caller ID information displayed. That is, device manager 2500 uses client device B 2506 to support service component A at the same time that the device manager uses client device C 2700 to support both service component A and service component B.

In at least this particular embodiment, device manager 2500 is able to continue the particular service, i.e., a voice call, through a transition from a phone handset to another handset which comprises components usable to support a particular service.

Figure 28:
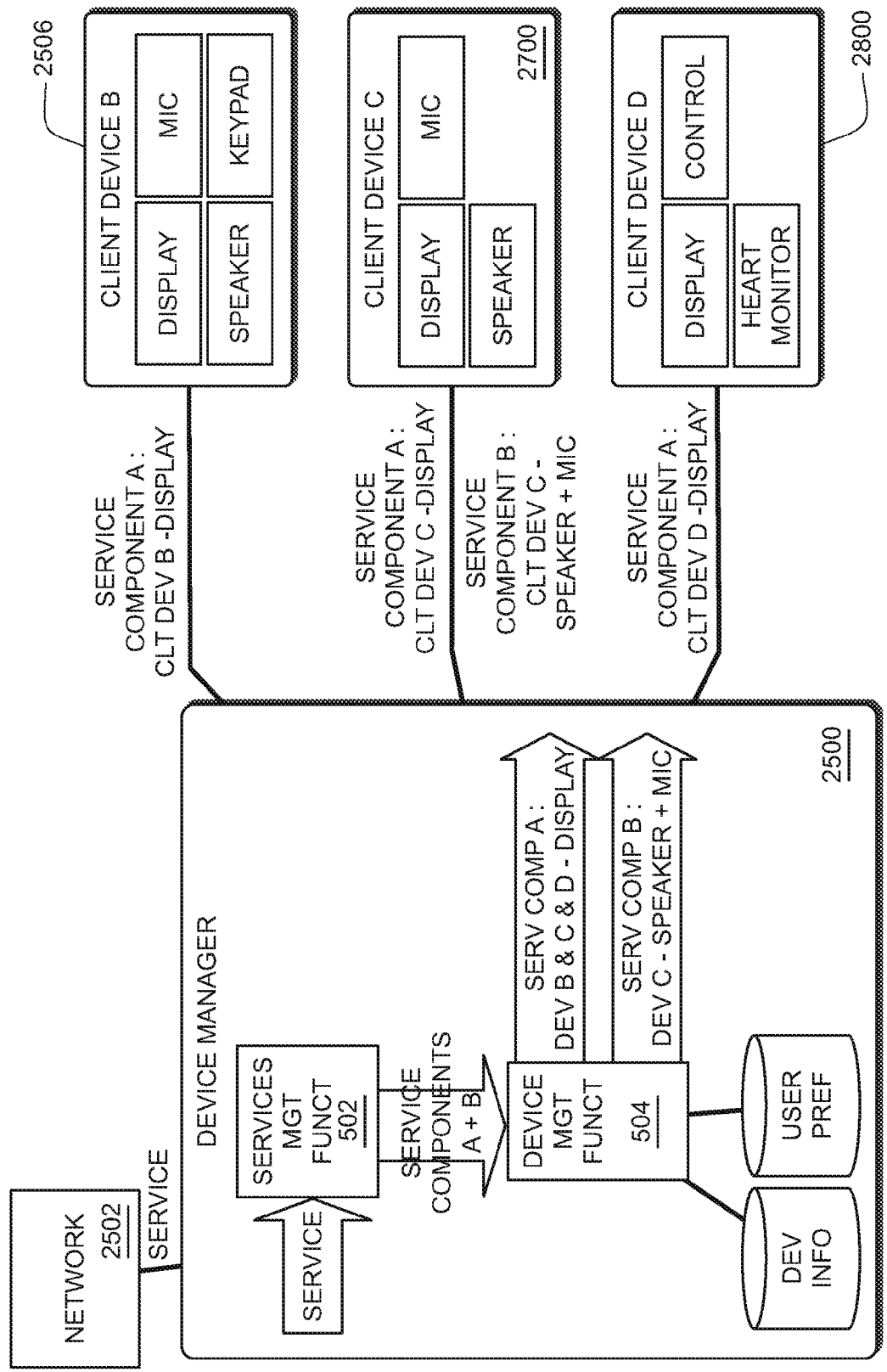
FIG. 28 is a high-level functional block diagram of a device manager communicating with a network and client devices according to an embodiment.

FIG. 28 depicts device manager 2500 communicating with network 2502 at a point later in time with respect to at least FIG. 27. At the time depicted in FIG. 28, a new client device D 2800 has either been activated or moved within predetermined region 118 (FIG. 1). Client device D 2800, e.g., heart rate monitor device 108 (FIG. 1), comprises a display, a control interface, and a heart monitor. Similar to FIG. 27, in accordance with one or more user preferences and/or system parameters 216, device manager 2500 adds the handling of a portion of the particular service to client device D 2800, i.e., the device manager uses a heart rate monitor to display caller ID information. In at least some embodiments, the decision to display caller ID information on heart rate monitor device 2800 may be based on a user preference with respect to the particular caller indicated by the caller ID information, i.e., the user may have identified a particular caller as being of such importance that the user wishes to be notified on all client devices.

In at least some embodiments, device manager 2500 may cause execution of all or a portion of a service at a later time based on the availability of one or more client devices having particular device component capabilities. For example with respect to FIG. 28, if client device B 2506 is unavailable or disconnected from device manager 2500 and a short message service (SMS) message is received by device manager 2500, the device manager may cause the SMS message to be displayed on either client device C 2700 or client device D 2800, depending on user preferences and/or service parameters. However, because neither client device, i.e., C 2700 or D 2800, includes a capability to enable a user to compose a reply, the user is able to view and not respond to the SMS message at that time. During this time period, the user may view received SMS messages without responding. Depending on the particular configuration, storage of the received SMS message is performed by the service owning device, e.g., device manager 2500 or one of client devices C 2700 or D 2800. At a point later in time after client device B 2506 is available, device manager 2500 causes the client device B to prompt the user to reply to the received SMS message using the keypad capability of client device B. In accordance with at least one embodiment, device manager 2500 may provide a reduced portion of a particular service via one or more client devices or may defer providing all or a portion of a particular service via one or more client devices.

Figure 8:
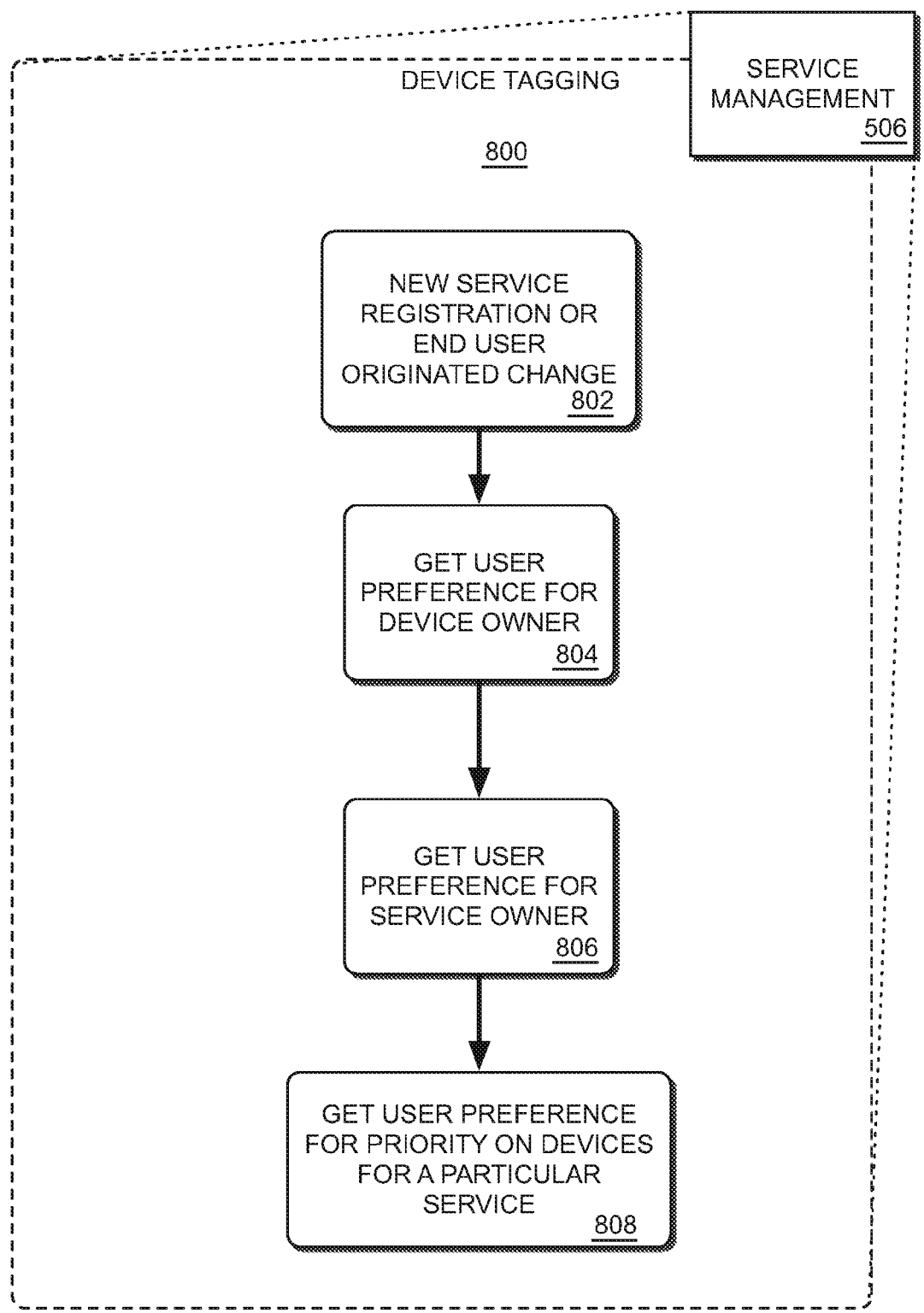
FIG. 8 is a high-level process flow diagram of a device tagging method of a service management module according to an embodiment.

FIG. 8 depicts a high-level process flow diagram of operation of at least a portion of a device tagging method 800 of service management module 506 according to an embodiment. Device tagging method 800 comprises a set of instructions which, when executed by processing device 202, cause the processing device to perform a particular set of functionality.

During device tagging method 800, a user of device manager 106 interacts with the device manager, either directly or via a client device, to input preferences related to client devices, data of the user, and services.

The flow begins at functionality 802 wherein a new service is registered with device manager 106 as a result of the addition of a new service to an existing client device, the device manager, and/or wireless network 102 or a user originated change of preferences. The flow then proceeds to functionality 804.

During execution of functionality 804, processing device 202 receives commands and/or information from a user of device manager 106 specifying user preference with respect to the device owner, e.g., is the client device owned by device manager 106. The received user preference is stored in memory 206.

The flow then proceeds to functionality 806 wherein processing device 202 receives commands and/or information from the user of device manager 106 specifying user preferences with respect to the ownership of one or more pieces of particular service, e.g., components of a service such as caller identifier (ID) information, voice path, etc. For example, service ownership may be specified to be device manager 106. In at least some embodiments, service ownership specifies one or more client devices.

The flow then proceeds to functionality 808 wherein processing device 202 receives commands and/or information from the user of device manager 106 specifying a particular priority by which the user desires the device manager to assign a particular service among one or more client devices for a particular service. The flow then proceeds to end.

Figure 9:
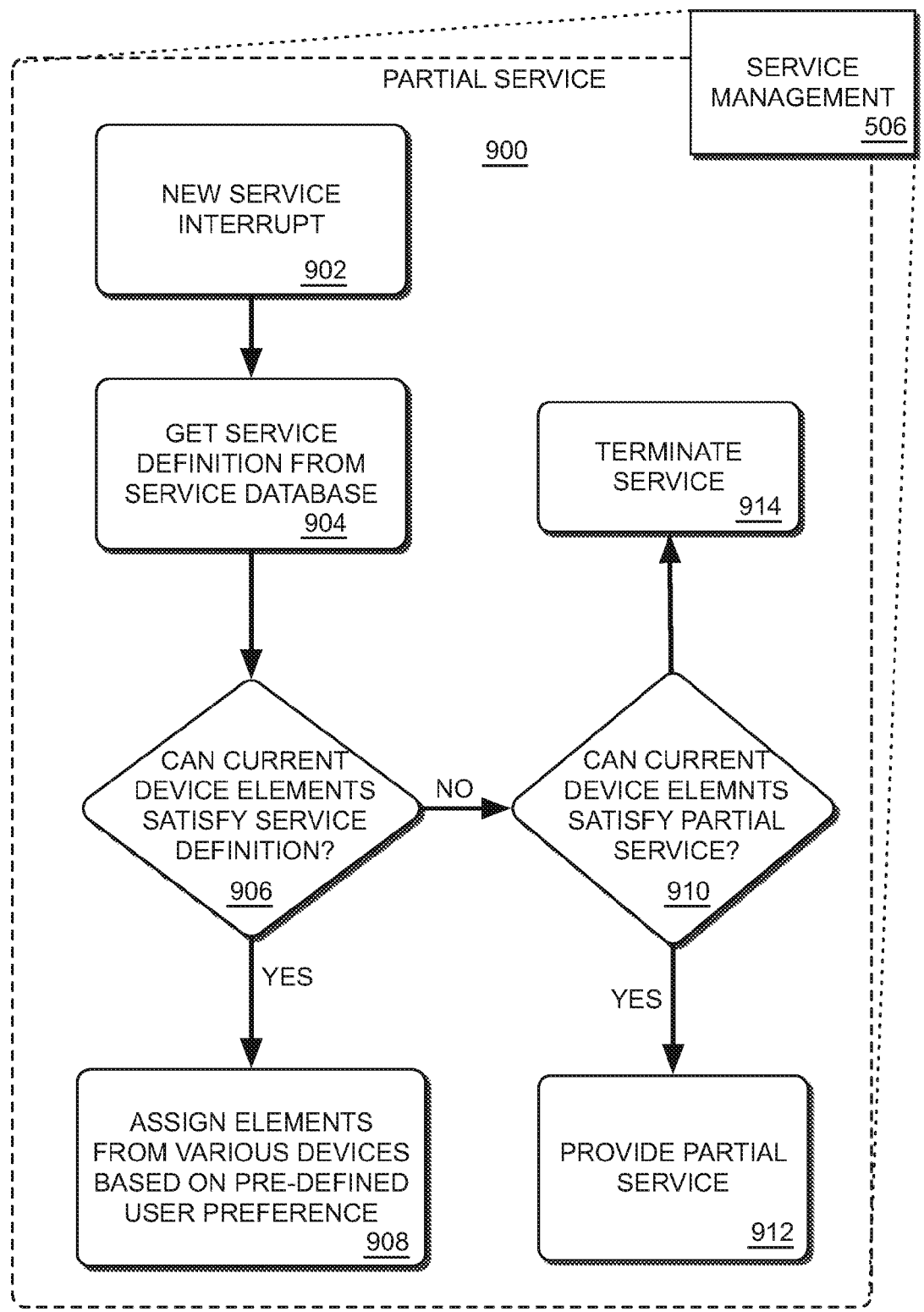
FIG. 9 is a high-level process flow diagram of a partial service method of a service management module according to an embodiment.

FIG. 9 depicts a high-level process flow diagram of operation of at least a portion of a partial service method 900 of service management module 506 according to an embodiment. Partial service method 900 is similar to service routing method 600 (FIG. 6). Partial service method 900 comprises a set of instructions which, when executed by processing device 202, cause the processing device to perform a particular set of functionality.

The flow begins at functionality 902 wherein a new service interrupt is received by device manager 106. Device manager 106 receives the service interrupt from wireless network 102, e.g., the wireless network transmits information to the device manager according to a particular service to which a user of the device manager may be subscribed. The flow proceeds to functionality 904.

Responsive to receipt of the new service interrupt by device manager 106, the device manager retrieves the service definition corresponding to the perceived service interrupt. In at least some embodiments, device manager 106 retrieves the service definition from a service definition database stored in memory 206. The retrieved service definition specifies a set of attributes, i.e. hardware attributes set and/or service attribute set, of a client device needed to be able to handle the received service. In at least some embodiments, the received service interrupt comprises the service definition within the interrupt.

If a corresponding service definition does not exist, the service routing method 900 ends and/or returns to an idle state awaiting a new service interrupt. If the corresponding service definition exists, the flow proceeds to functionality 906.

During execution of functionality 906, device manager 106 determines whether there is a current client device able to satisfy the identified service definition corresponding to the received service interrupt. That is, device manager 106 determines whether a client device within predetermined region 118 comprises a hardware attribute set and/or a service attribute set meeting the specified needs of the service definition. If the result of functionality 906 is positive ("YES"), the flow proceeds to functionality 908 wherein device manager 106 assigns elements from at least one device to satisfy the service definition. In at least some embodiments, device manager 106 assigns one or more of hardware and/or service attributes of a particular client device to receive at least a portion of the service corresponding to the received service interrupt. In at least some embodiments, device manager 106 assigns elements based on predefined user preferences regarding client devices and/or services. In at least some embodiments, the predefined user preferences are stored in memory 206.

The flow then proceeds to end and/or returns to an idle state awaiting a new service interrupt.

If the result of functionality 906 is negative ("NO"), the flow proceeds to functionality 910 and the service routing method 900 determine whether a thin client device, e.g. a client device having a capability to handle at least a portion of the service from device manager 106, exists within predetermined region 118. In at least some embodiments, device manager 106 determines whether a thin client is available based on the content of hardware attribute set and/or service attribute set of the client devices.

If the result of functionality 910 is positive ("YES"), the flow proceeds to functionality 912 and device manager in conjunction with the identified thin client provides at least a portion of service to the user. For example, in a given scenario where a client device having both audio and video capabilities fails or becomes otherwise unavailable to support audio and video service for device manager 106, the device manager may determine to utilize a client device having only audio capabilities or only video capabilities in order to provide partial service to the user. In accordance with such a scenario, the user would be able to continue to either hear audio or see video, e.g., continuing communication and a video chat service to a lesser degree.

If the result of functionality 910 is negative ("NO"), the flow proceeds to functionality 914 and device manager 106 terminates provision of the service to the user. The flow then proceeds to end and/or returns to an idle state awaiting a new service interrupt.

Figure 10:
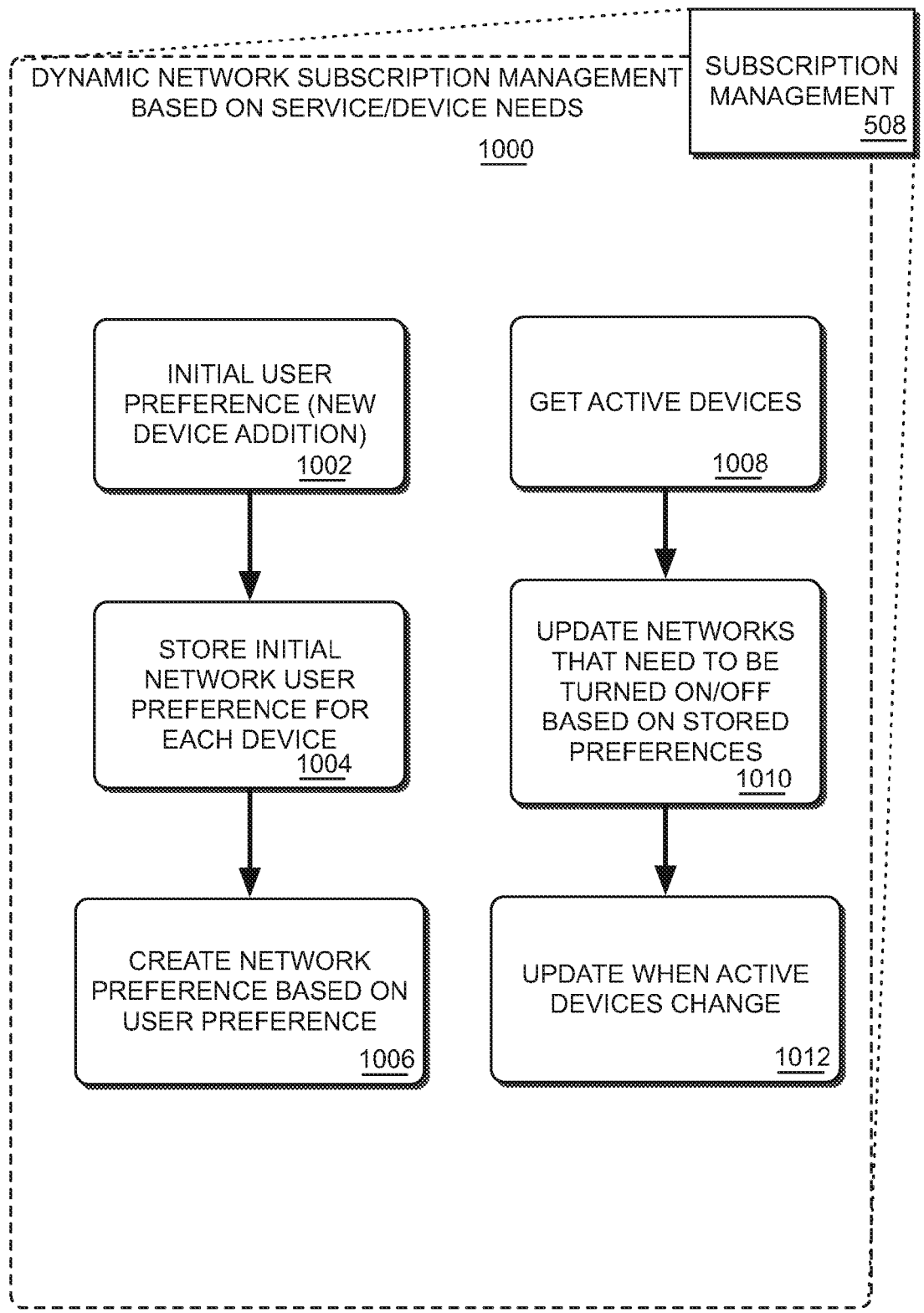
FIG. 10 is a high-level process flow diagram of a dynamic network subscription management method of a subscription management module according to an embodiment.

FIG. 10 depicts a high-level process flow diagram of operation of at least two portions of a dynamic network subscription management method 1000 of a subscription management module according to an embodiment. Dynamic network subscription management method 1000 comprises a set of instructions which, when executed by processing device 202, cause the processing device to perform a particular set of functionality.

In accordance with the first portion of dynamic network subscription management method 1000, the flow begins at functionality 1002 wherein initial user preferences are received and stored, e.g., in memory 206, by device manager 106 as a result of a new client device moving within predetermined region 118. A user of device manager 106 provides the user preferences via either an I/O of the device manager or a client device providing an I/O. The flow then proceeds to functionality 1004.

During execution of functionality 1004, device manager 106 stores the initial network user preference for each specific client device added to the device manager. In at least some embodiments, the user preference for a specific client device comprises a device priority. In at least some other embodiments, a user preference for a specific service on a client device comprises a service allocation priority. Device manager 106 uses the stored preferences in determining network subscriptions based on active devices in functionality 1006. The flow then proceeds to functionality 1006.

During execution of functionality 1006, device manager 106 creates a network preference for the client device based on the received user preference and current active client devices. In at least some embodiments, the network preference and network subscription is dynamically managed by device manager 106 based on the active client devices and stored user preferences.

The flow then proceeds to end and/or returns to an idle state.

In accordance with the second portion of dynamic network subscription management method 1000, the flow begins at functionality 1008 wherein the active client devices within predetermined region 118 is determined. In at least some embodiments, the active devices comprise client devices in communication with device manager 106 via NAN communication I/F 210 (FIG. 2). The flow then proceeds to functionality 1010.

During execution of functionality 1010, device manager 106 updates the networks needed to support one or more client devices based on stored preferences, e.g., in memory 206. The networks comprise the communication between device manager 106 and wireless network 102. The flow then proceeds to functionality 1012.

During functionality 1012, device manager 106 performs an update after detecting a change of active devices within predetermined region 118. In at least some embodiments, execution of functionality 1012 comprises repeated execution of functionality 1010.

Figure 11:
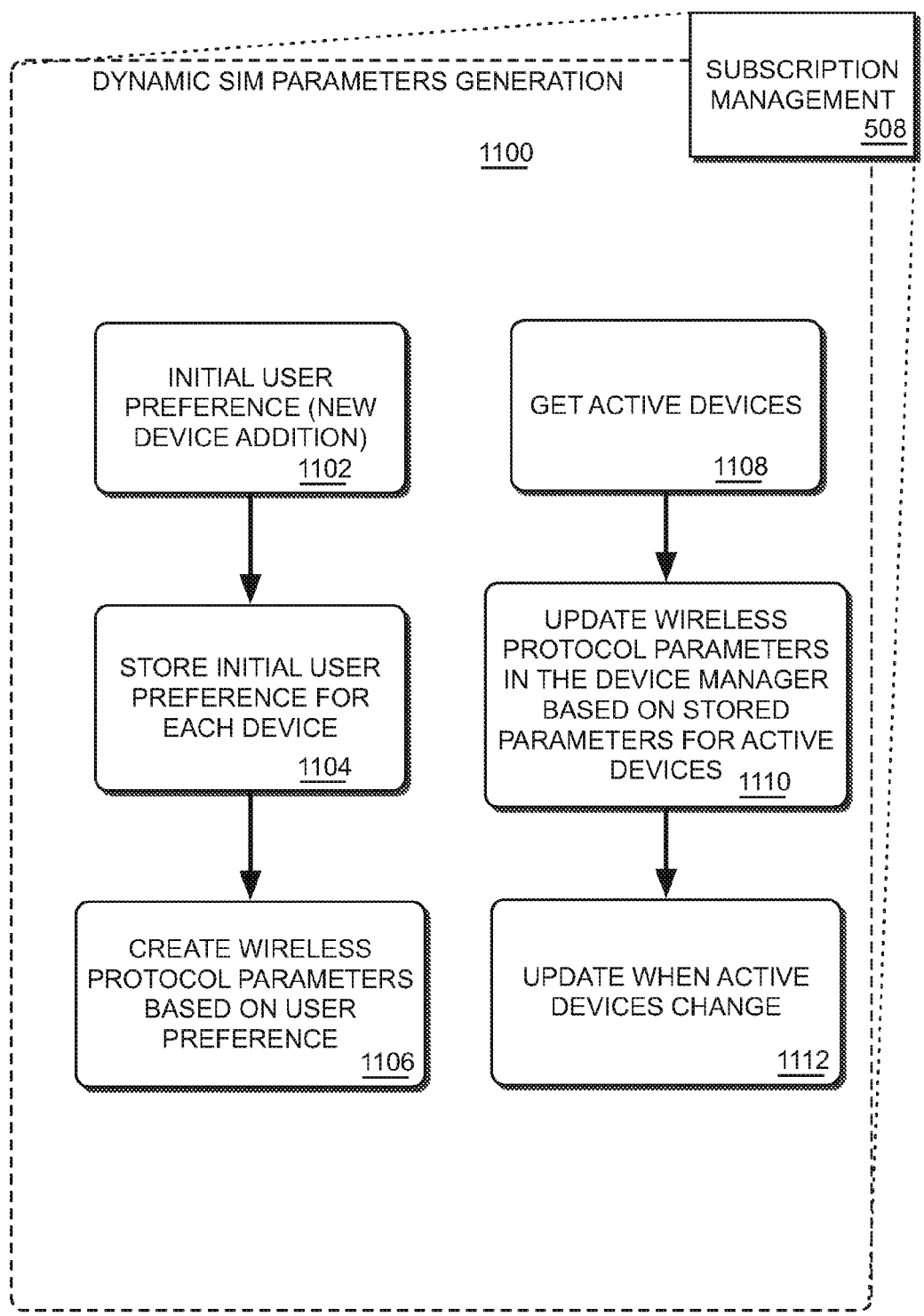
FIG. 11 is a high-level process flow diagram of a dynamic SIM parameters generation method of a subscription management module according to an embodiment.

FIG. 11 depicts a high-level process flow diagram of operation of at least two portions of a dynamic SIM parameters generation method 1100 of a subscription management module according to an embodiment. Dynamic SIM parameters generation method 1100 comprises a set of instructions which, when executed by processing device 202, cause the processing device to perform a particular set of functionality.

In accordance with the first portion of dynamic SIM parameters generation method 1100, the flow begins at functionality 1102 wherein initial user preferences are received and stored, e.g., in memory 206, by device manager 106 as a result of a new client device moving within predetermined region 118. A user of device manager 106 provides the user preferences via either an I/O of the device manager or a client device providing an I/O. The flow then proceeds to functionality 1104.

During execution of functionality 1104, device manager 106 stores the initial user preference for each client device added to the device manager. In at least some embodiments, the initial user preference comprises an initial set of user preferences with respect to configuring device manager 106, e.g., enabling or disabling roaming capabilities, selecting preferred networks, establishing network settings, for example, related to wide area local area networks, etc. The flow then proceeds to functionality 1106.

During execution of functionality 1106, device manager 106 creates one or more wireless protocol parameters for the client device based on the received user preference. In accordance with at least some embodiments, one or more wireless protocol parameters may be changed by device manager 106 based on the current active client device(s). Responsive to a change in active client devices, device manager 106 modifies the wireless protocol parameters for a particular wireless network access.

The flow then proceeds to end and/or returns to an idle state.

In accordance with the second portion of dynamic SIM parameters generation method 1100, the flow begins at functionality 1108 wherein the active client devices within predetermined region 118 are determined. In at least some embodiments, the active devices comprise client devices in communication with device manager 106 via NAN communication I/F 210 (FIG. 2). The flow then proceeds to functionality 1110.

During execution of functionality 1110, device manager 106 updates the wireless protocol parameters, e.g., stored in memory 206, based on stored parameters, e.g., from first portion of dynamic SIM parameters generation method 1100, for active client devices. The flow then proceeds to functionality 1112.

During functionality 1112, device manager 106 performs an update after detecting a change of active devices within predetermined region 118. In at least some embodiments, execution of functionality 1112 comprises repeated execution of functionality 1110.

Figure 12:
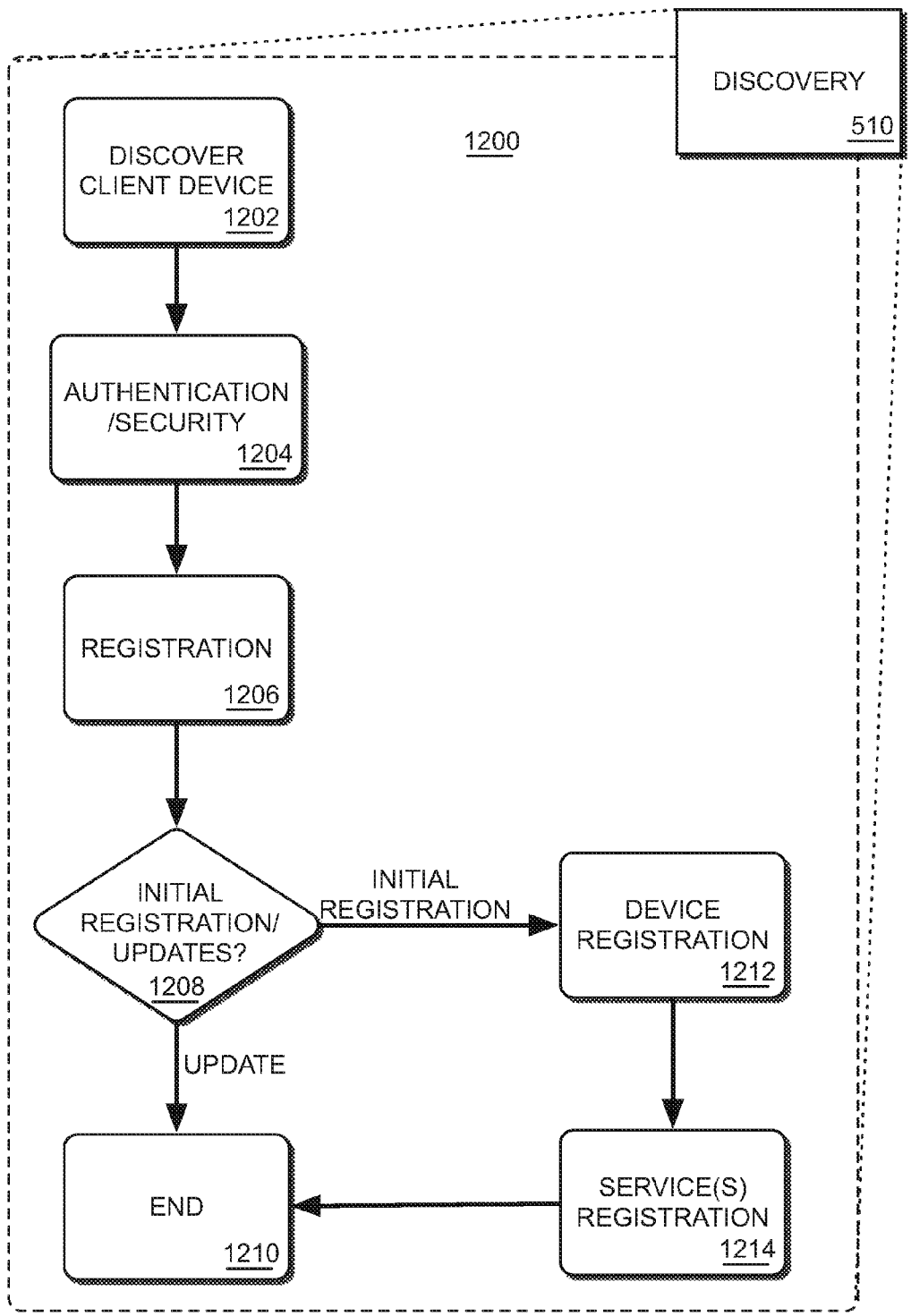
FIG. 12 is a high-level process flow diagram of a discovery module according to an embodiment.

FIG. 12 Is a high-level process flow diagram of a least a portion of discovery module 510 according to an embodiment. Discovery module 510 comprises a set of instructions which, when executed by processing device 202, cause the processing device to perform a particular set of functionality.

The flow begins at functionality 1202 wherein one or more client devices are discovered by device manager 106, e.g., using NAN communication I/F 210. The flow then proceeds to functionality 1204.

During execution of functionality 1204, one or more authentication and/or security methods may be used with respect to a discovered client device. Authentication and/or security is used to prevent and/or minimize the likelihood of device manager 106 inadvertently and/or unexpectedly establishing communication with a client device other than one with which a connection is desired. The flow then proceeds to functionality 1206.

During functionality 1206, device manager 106 performs registration of the client device with the device manager. In at least some embodiments, execution of registration functionality 1206 may comprise exchanging identifying information concerning either or both of the client device and/or device manager 106. The flow then proceeds to functionality 1208. In at least some embodiments, functionality 1206 is executed on each occurrence of client device discovery. In accordance with such embodiment, if there are no updates or initial registration to be performed with respect to the client device discovered, device manager 106 adds the client device to a list of current active devices and the client device returns to an idle state.

During execution of functionality 1208, device manager 106 determines whether the registration of the client device is an initial registration or an update of an existing registration. In at least some embodiments, device manager 106 refers to one or more stored pieces of information, e.g., in memory 206, in order to determine whether the registration is an initial registration or an update of an existing registration.

If the result of functionality 1208 is an update of an existing registration, the flow proceeds to functionality 1210 and the flow proceeds to end and/or enter an idle state.

If the result of functionality 1208 is an initial registration, the flow proceeds to functionality 1212 and device registration is performed. In at least some embodiments, functionality 1208 is executed for only a first registration of a client device with device manager 106. In at least some embodiments, the registration which occurs is similar to or the same as depicted and described in conjunction with FIGS. 14 and 15. The flow then proceeds to service registration functionality 1214.

In at least some embodiments, functionality 1212 comprises locking a particular client device to device manager 106 to the exclusion of communication with other device managers which the client device may be within the predetermined region 118. In at least some embodiments, the client device may be prevented from communicating with other device managers in range of the client device. In this manner, control and security of the client device remains with the device manager to which the client device is registered.

Figure 13:
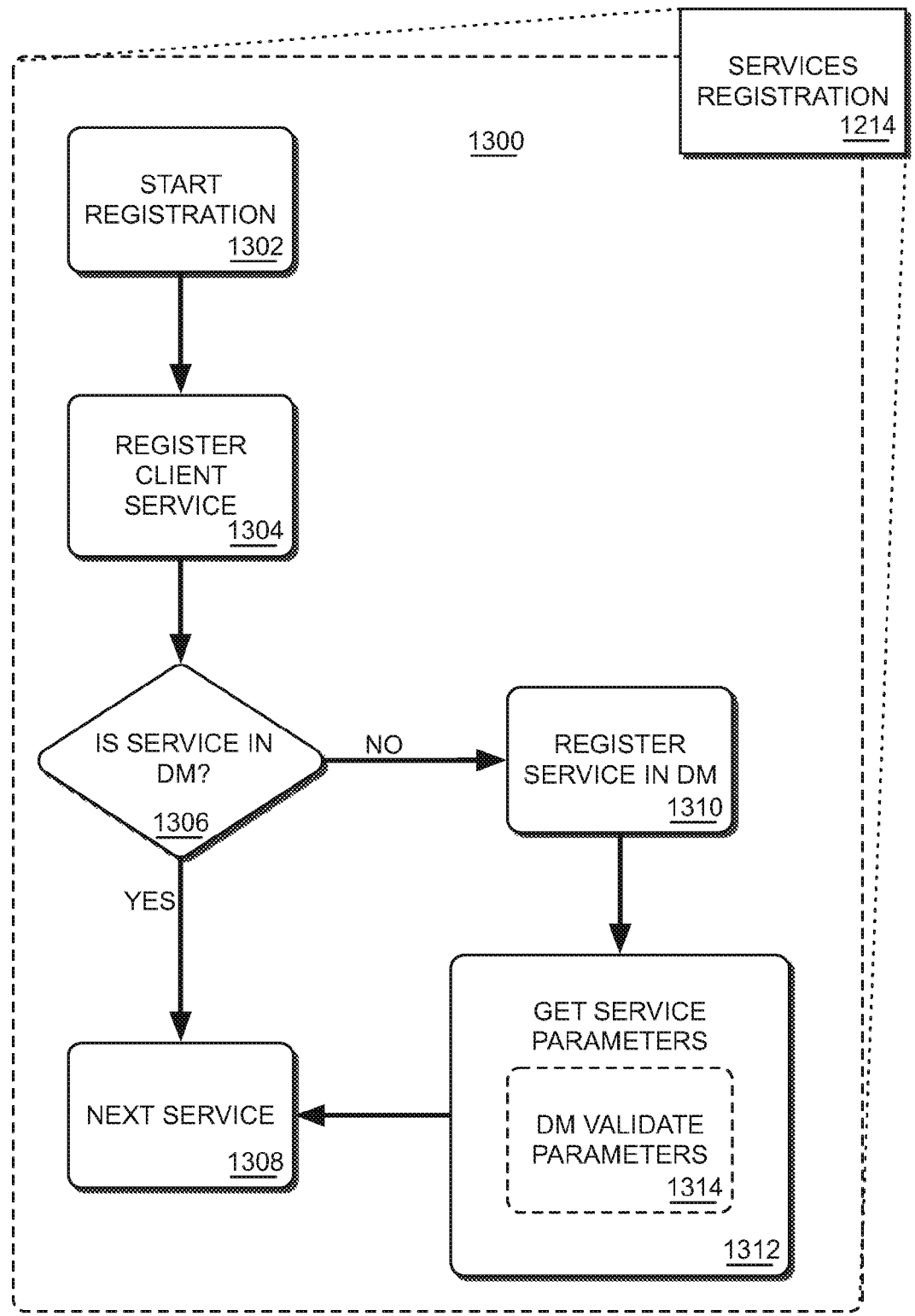
FIG. 13 is a high-level process flow diagram of a services registration module according to an embodiment.

Service registration functionality 1214, described in more detail with respect to FIG. 13, enables device manager 106 to obtain information corresponding to services provided and were supported by a client device. The flow then proceeds to functionality 1210.

FIG. 13 is a high-level process flow diagram of a least a portion of services registration functionality 1214 (FIG. 12). The process flow begins at functionality 1302 wherein services registration functionality 1214 is begun. During execution of functionality 1302, a client device registers with device manager 106, e.g., provides information regarding hardware and/or service attribute set of the client device, and/or provides service definition information to the device manager.

The flow then proceeds to functionality 1304 wherein the service provided and/or supported by the particular client device is registered. The flow then proceeds to functionality 1306.

During execution of functionality 1306, device manager 106 determines if the client service identified to be registered in functionality 1304 is a service known to the device manager, e.g., whether the device manager already stores information corresponding to the identified service in memory 206.

If the result of functionality 1306 is positive ("YES"), the flow proceeds to functionality 1308 and device manager 106 checks for another service from the client device to be registered. If there are no more services to be registered, the flow proceeds to end and/or enter an idle state.

If the result of functionality 1306 is negative ("NO"), the flow proceeds to functionality 1310 and the device manager registers the identified service, e.g., prepares an entry in memory 206 corresponding to the identified client service. The flow then proceeds to functionality 1312.

During execution of functionality 1312, device manager 106 receives parameters corresponding to the client service being registered. In at least some embodiments, the service parameters received by device manager 106 correspond to the content of the service attribute set of the client device.

In accordance with at least one embodiment, functionality 1312 comprises an optional validation functionality 1314 during which the service parameters received by the device manager are validated, for example through the use of wireless network 102 to access a validation service such as a computer system connected to wireless network 102 or another network reachable by wireless network 102. In at least some embodiments, validation of a service parameter comprises a determination of whether the service parameters are approved by the validation service. In at least some embodiments, functionality 1314 may be used to validate a particular client device.

The flow then proceeds to functionality 1308.

Figure 14:
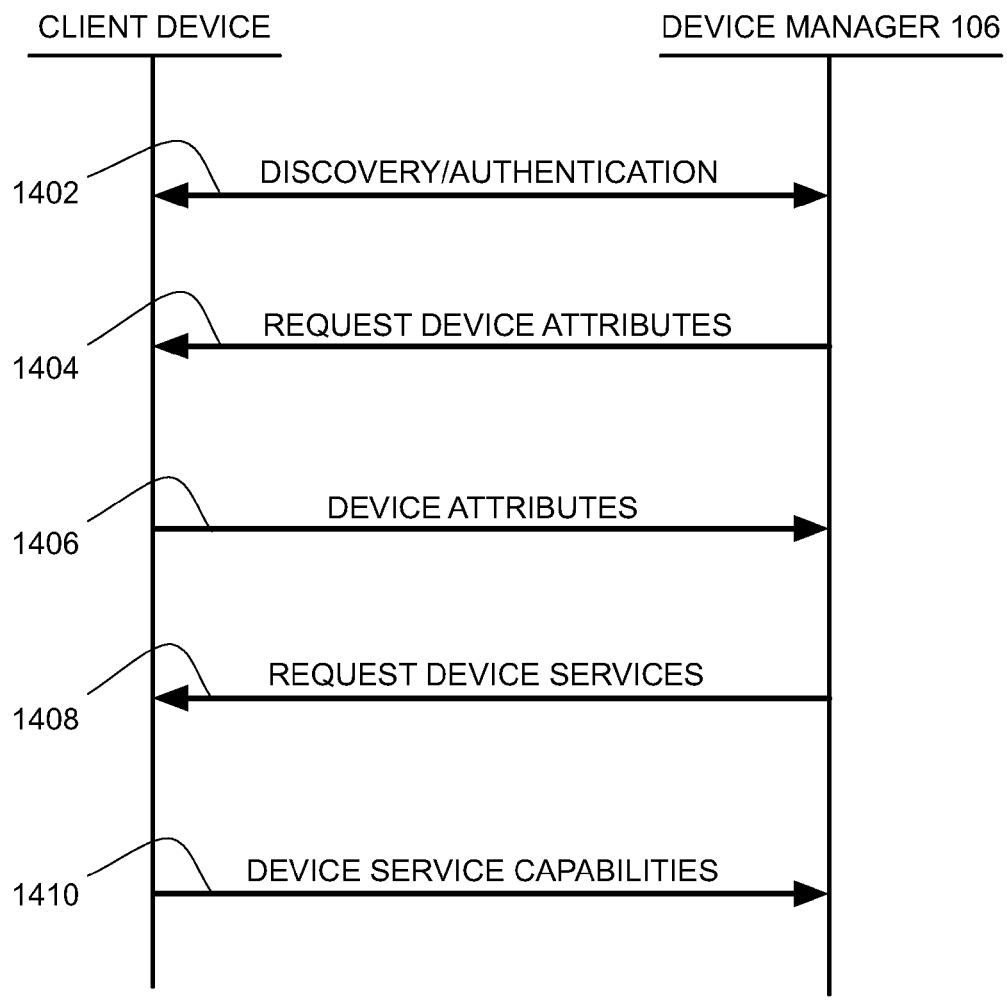
FIG. 14 is a high-level message sequence diagram of a message exchange between a client device and device manager according to an embodiment.

FIG. 14 is a high-level message sequence diagram depicting the exchange of messages between a client device and device manager 106 wherein the client device informs the device manager about client device attributes and services. Initially, during message exchange 1402, the client device and device manager 106 exchange discovery and/or authentication messages.

Next, device manager 106 transmits a message 1404 requesting device attributes of the client device, e.g., H/W attribute set 2406 (FIG. 24). In response, the client device transmits a message 1406 providing the requested device attributes to device manager 106.

Next, device manager 106 transmits a message 1408 requesting device services of client device, e.g. service attribute set 2408 (FIG. 24). In response, the client device transmits a message 1410 providing the requested service attributes to device manager 106.

Figure 15:
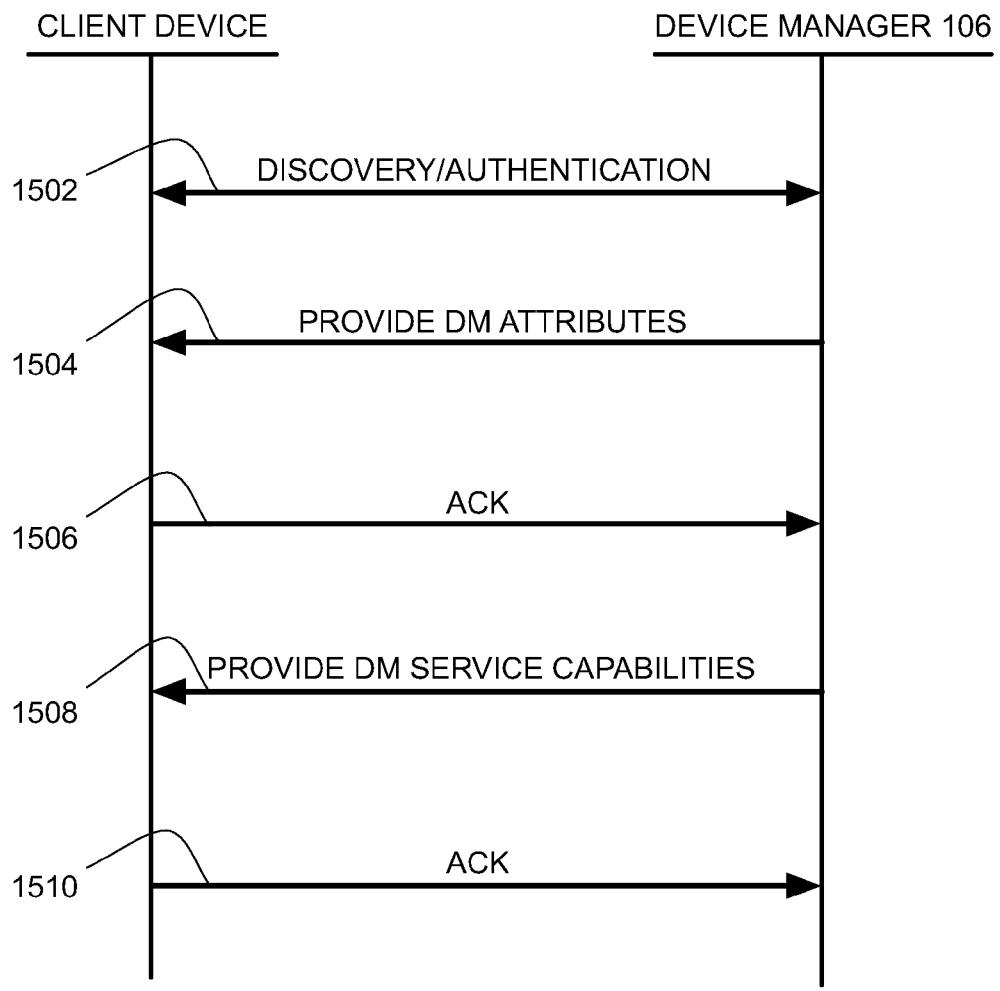
FIG. 15 is a high-level message sequence diagram of a message exchange between a client device and device manager according to an other embodiment.

FIG. 15 is a high-level message sequence diagram depicting the exchange of messages between a client device and device manager 106 wherein the device manager informs the client device about device manager attributes and services. Initially, during message exchange 1502, the client device and device manager 106 exchange discovery and/or authentication messages.

Next, device manager 106 transmits a message 1504 providing device manager attributes. In response, the client device transmits a message 1506 providing an acknowledgment of the message 1504 receipt.

Next, device manager 106 transmits a message 1508 providing device manager service capabilities, e.g., service attributes, to the client device. In response, the client device transmits a message 1510 are binding acknowledgment of receipt of message 1508.

Figure 16:
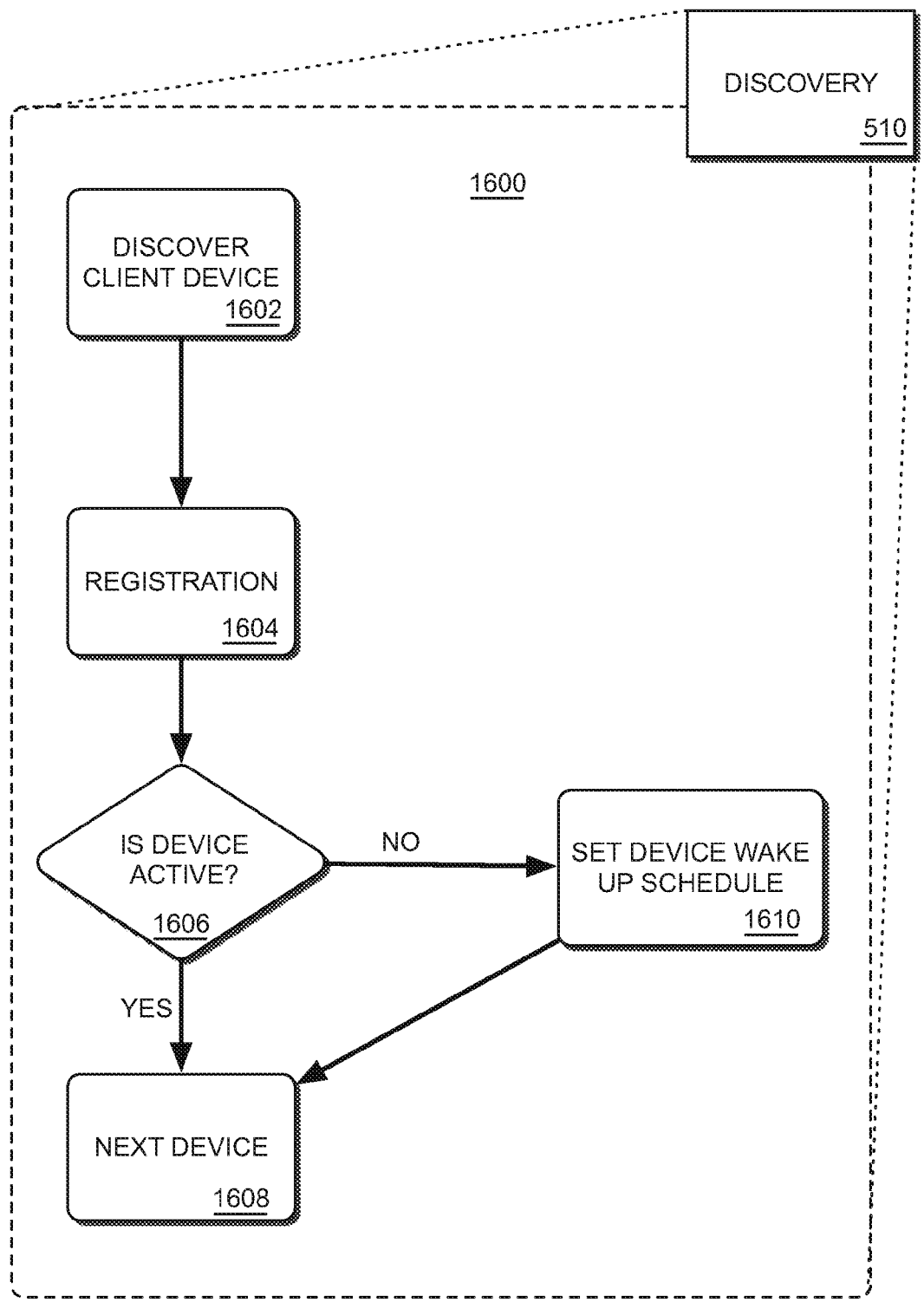
FIG. 16 is a high-level process flow diagram of at least a portion of discovery module according to an embodiment.

FIG. 16 is a high-level process flow diagram of at least a portion of discovery module 510 according to an embodiment. The flow begins at functionality 1602 wherein device manager 106 discovers, e.g., through the use of NAN communication I/F 210, a client device within predetermined region 118. The flow then proceeds to functionality 1604.

During execution of functionality 1604, registration of the discovered client device is performed between the client device and device manager 106. The flow then proceeds to functionality 1606.

During execution of functionality 1606, device manager 106 determines whether the registered client device is active. If the result of functionality 1606 is positive ("YES"), the flow then proceeds to functionality 1608 and device manager 106 determines whether there is a next device. If there is no next device, the flow proceeds to end and/or enter an idle state.

If the result of functionality 1606 is negative ("NO"), the flow then proceeds to functionality 1610 and device manager 106 sets a device wakeup schedule for the client device. The flow then proceeds to functionality 1608. In at least some embodiments, device manager 106 prompts a user to establish a device wakeup schedule for the particular client device. In at least some embodiments, device manager 106 establishes the wakeup schedule for the particular client device based on previously established user preferences.

Figure 17:
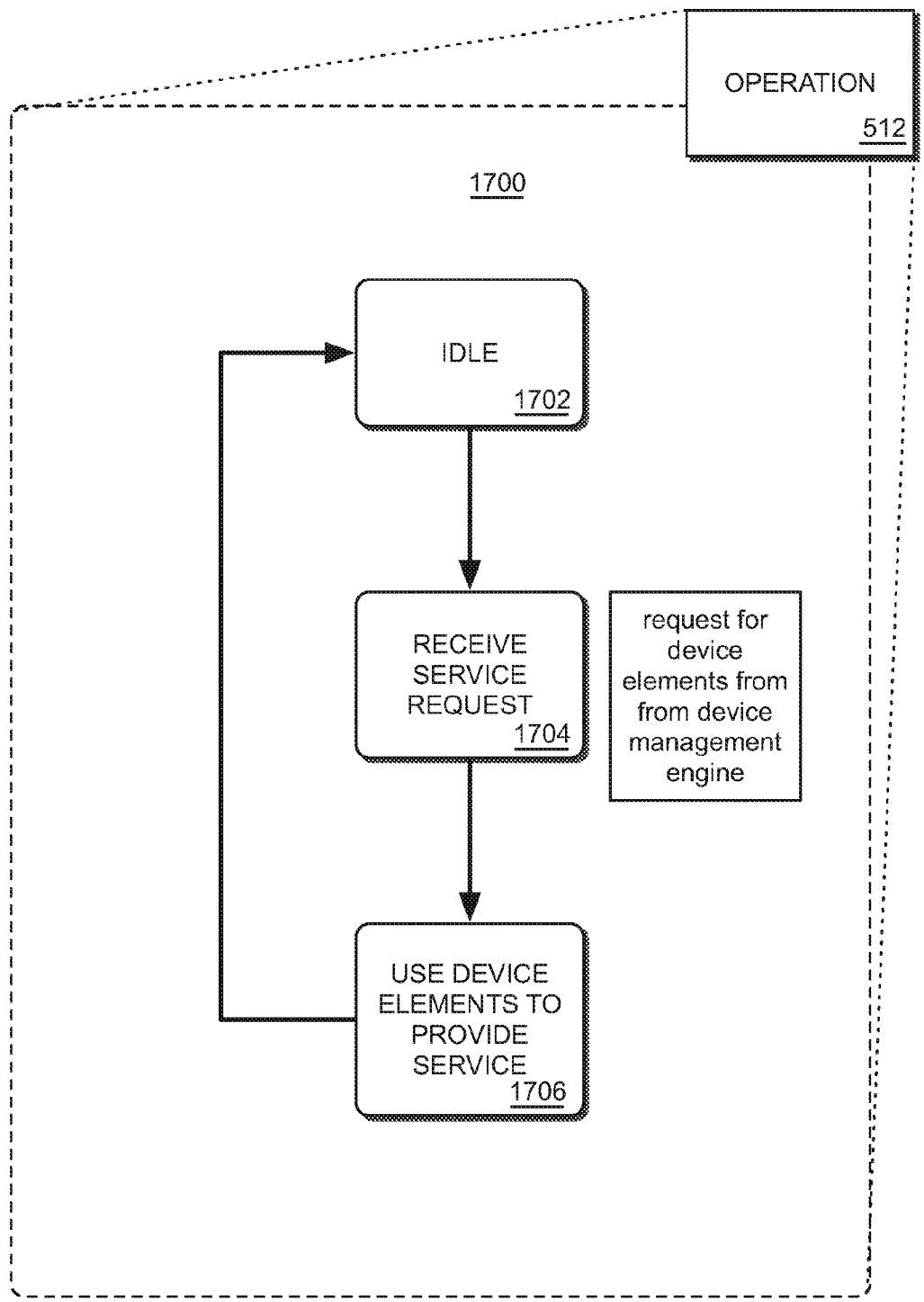
FIG. 17 is a high-level process flow diagram of at least a portion of operation module according to an embodiment.

FIG. 17 is a high-level process flow diagram of at least a portion of operation module 512 according to an embodiment. The flow begins at functionality 1702 wherein device manager 106 is in an idle state. Responsive to receipt of a request for device attributes of a client device, e.g. from another module of personal device management system 214, the flow proceeds to functionality 1704 wherein the service request is received. The flow then proceeds to functionality 1706 wherein device manager 106 uses one or more elements, e.g., hardware attributes, a client device to provide the requested service. The flow then returns to idle state 1702.

Figure 18:
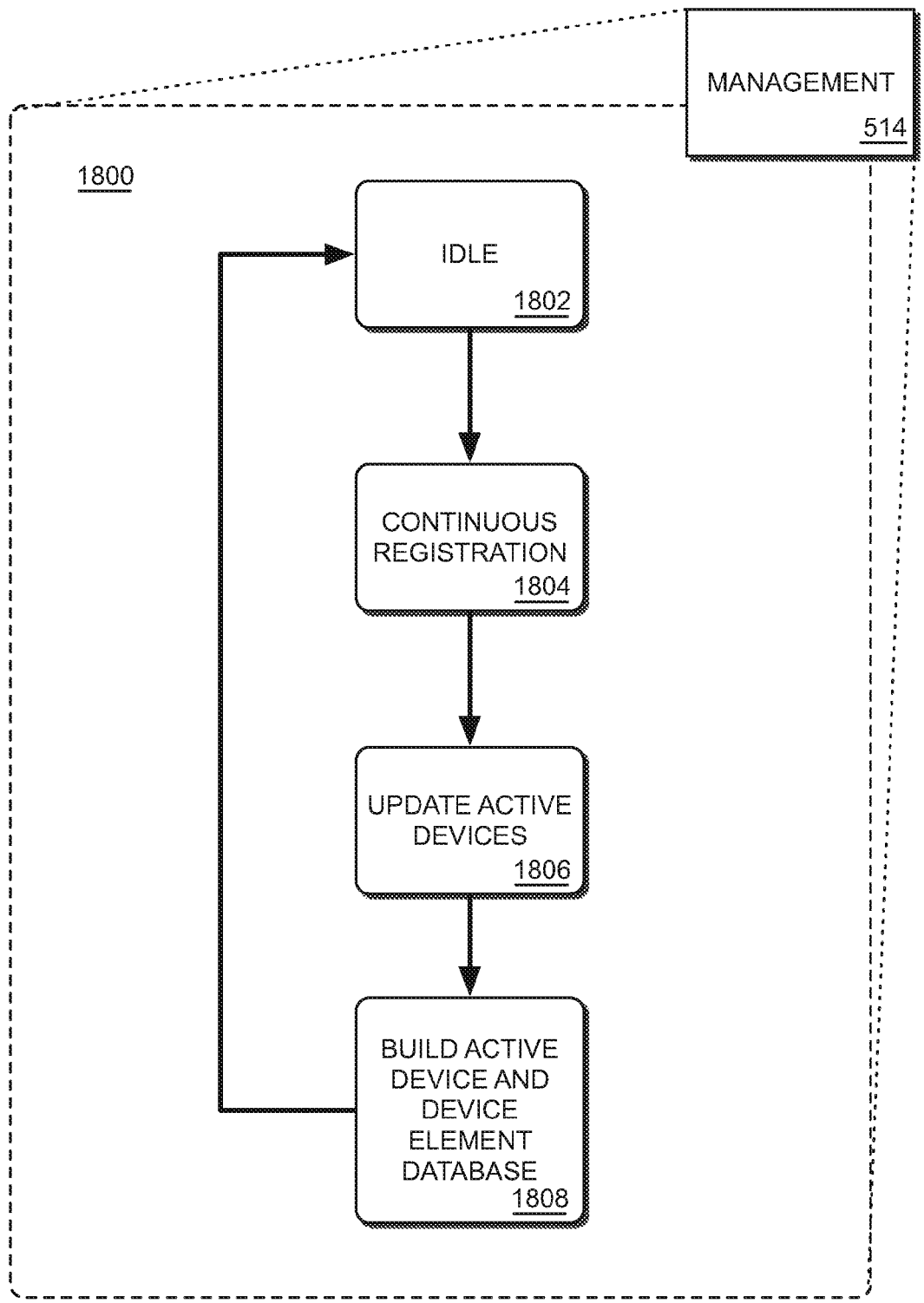
FIG. 18 is a high-level process flow diagram of at least a portion of management module according to an embodiment.

FIG. 18 is a high-level process flow diagram of at least a portion of management module 514 according to an embodiment. The flow begins at functionality 1802 wherein device manager 106 is in an idle state. The flow than proceeds to functionality 1804 wherein device manager 106 performs continuous registration of client devices within predetermined region 118. Continuous registration comprises device manager 106 monitoring individual client device status to determine whether the client device has become active either based on a power on/off state change of the device or based on the client device proximity with respect to predetermined region 118.

The flow then proceeds to functionality 1806 wherein device manager 106 updates the active devices resulting from functionality 1804. The flow then proceeds to functionality 1808 were in device manager 106 stores information corresponding to the client device, e.g., in a device element database of memory 206. The flow then returns to idle state 1702.

Figure 19:
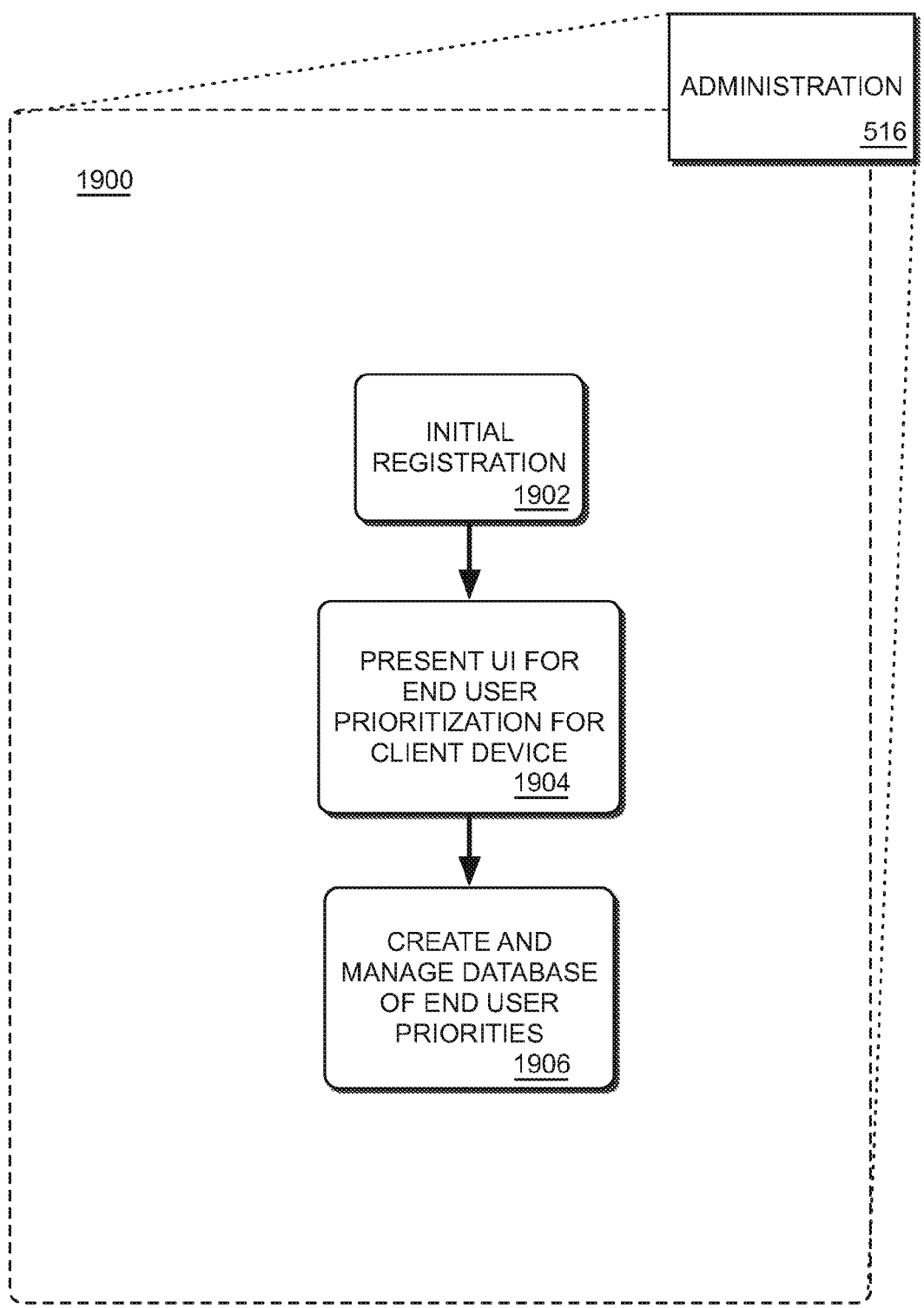
FIG. 19 is a high-level process flow diagram of at least a portion of administration module according to an embodiment.

FIG. 19 is a high-level process flow diagram of at least a portion 1900 of administration module 516 according to an embodiment. The flow begins at functionality 1902 wherein device manager 106 performs an initial registration with respect to a particular client device. The flow then proceeds to functionality 1904.

During execution of functionality 1904, device manager 106 presents a user interface for a user to establish participation of the particular client device with respect to other client devices. The flow then proceeds to functionality 1906.

During execution of functionality 1906, device manager 106 creates and manages a database of end-user priorities with respect to one or more client devices. In at least some embodiments, device manager 106 updates a database of end-user priorities during execution of functionality 1906 if such a database party exists. The flow then proceeds to end and/or enter an idle state.

Figure 20:
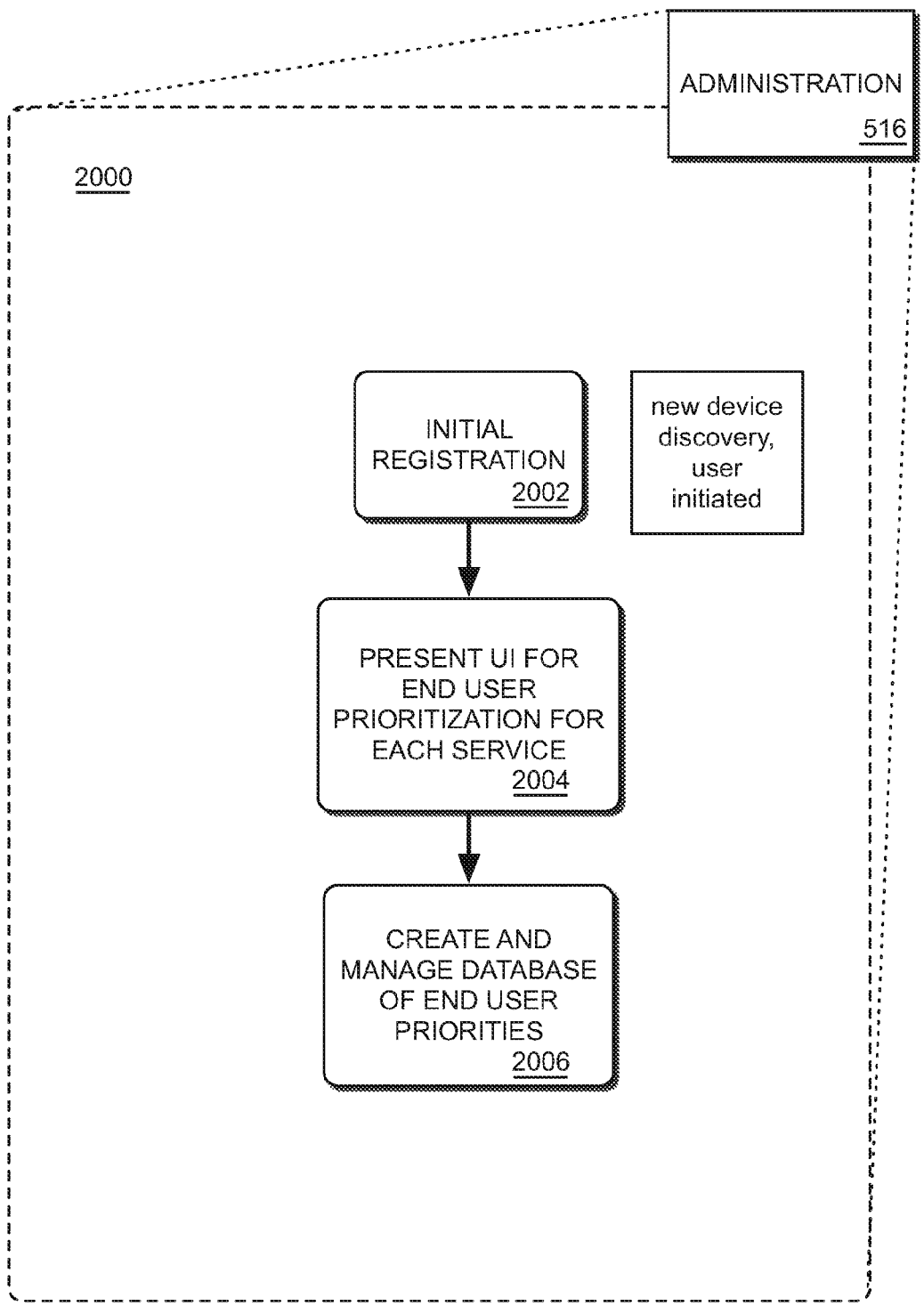
FIG. 20 is a high-level process flow diagram of a least another portion of administration module according to an embodiment.

FIG. 20 is a high-level process flow diagram of a least another portion 2000 of administration module 516 according to an embodiment. The flow begins at functionality 2002 where in device manager 106 performs an initial registration with respect to a particular client device, i.e., a new device discovered as a result of user initiation. The flow then proceeds to functionality 2004.

During execution of functionality 2004, device manager 106 presents a user interface for end user prioritization of each service of the particular device registered in functionality 2002. In at least some embodiments, device manager 106 via I/O 204 causes the display of a user interface to obtain the end-user prioritization. The flow then proceeds to functionality 2006.

During execution of functionality 2006, device manager 106 creates and manages a database of end-user priorities with respect to one or more client devices. In at least some embodiments, device manager 106 updates a database of end-user priorities during execution of functionality 2006 if such a database party exists. The flow then proceeds to end and/or enter an idle state.

Figure 21:
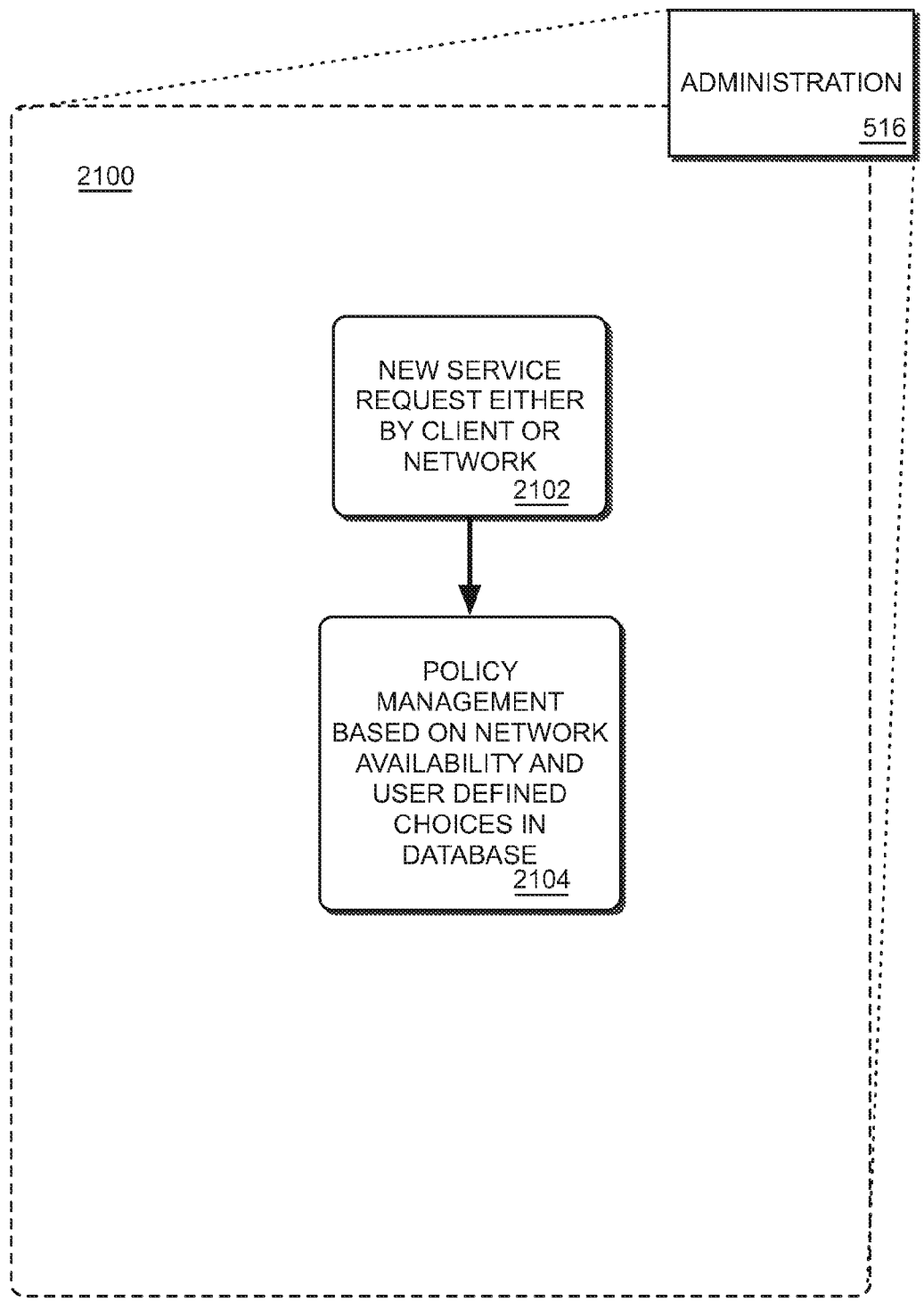
FIG. 21 is a high-level process flow diagram of a least another portion of administration module according to an embodiment.
Figure 22:
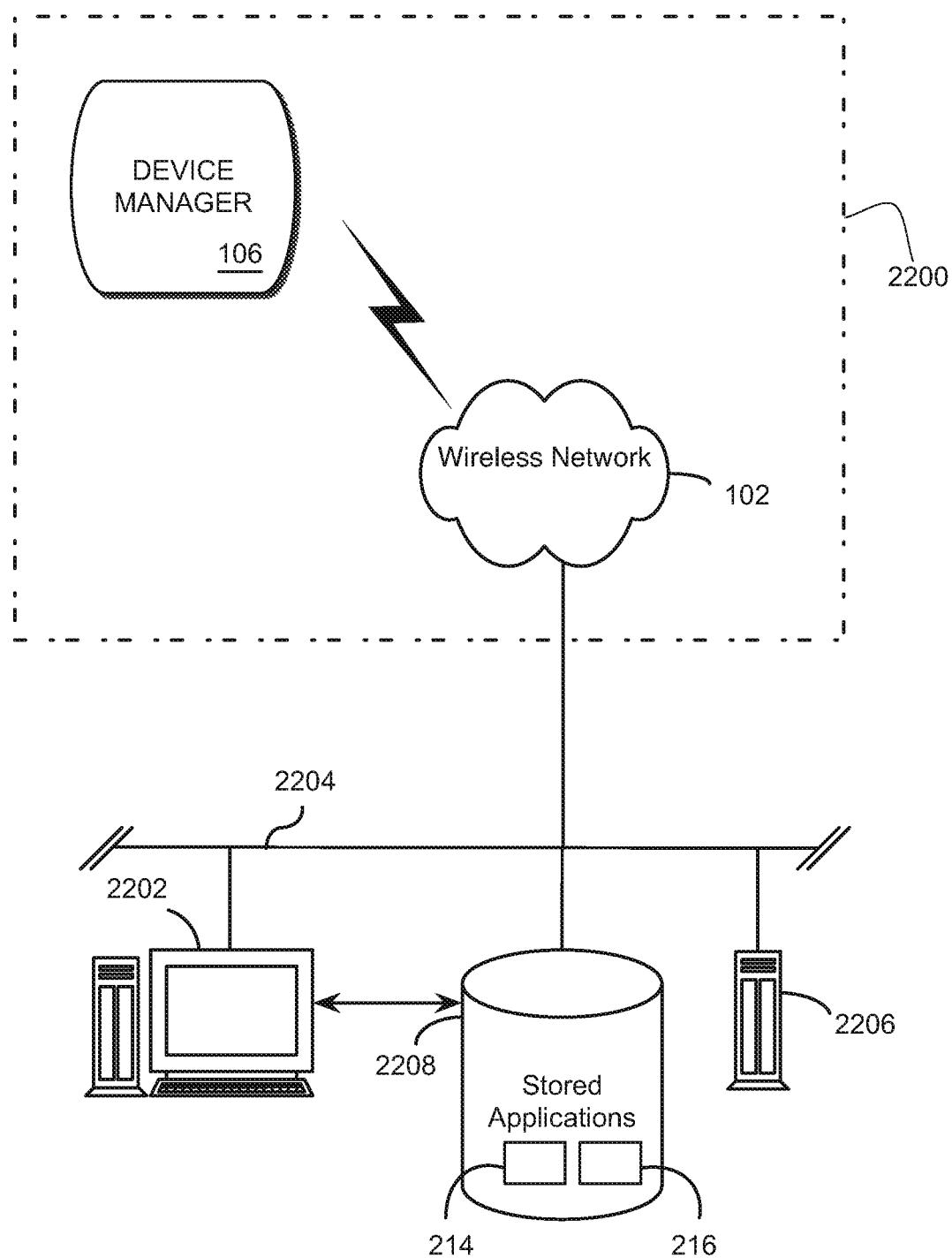
FIG. 22 is a high-level functional block diagram of a network system in which an embodiment is usable.
Figure 23:
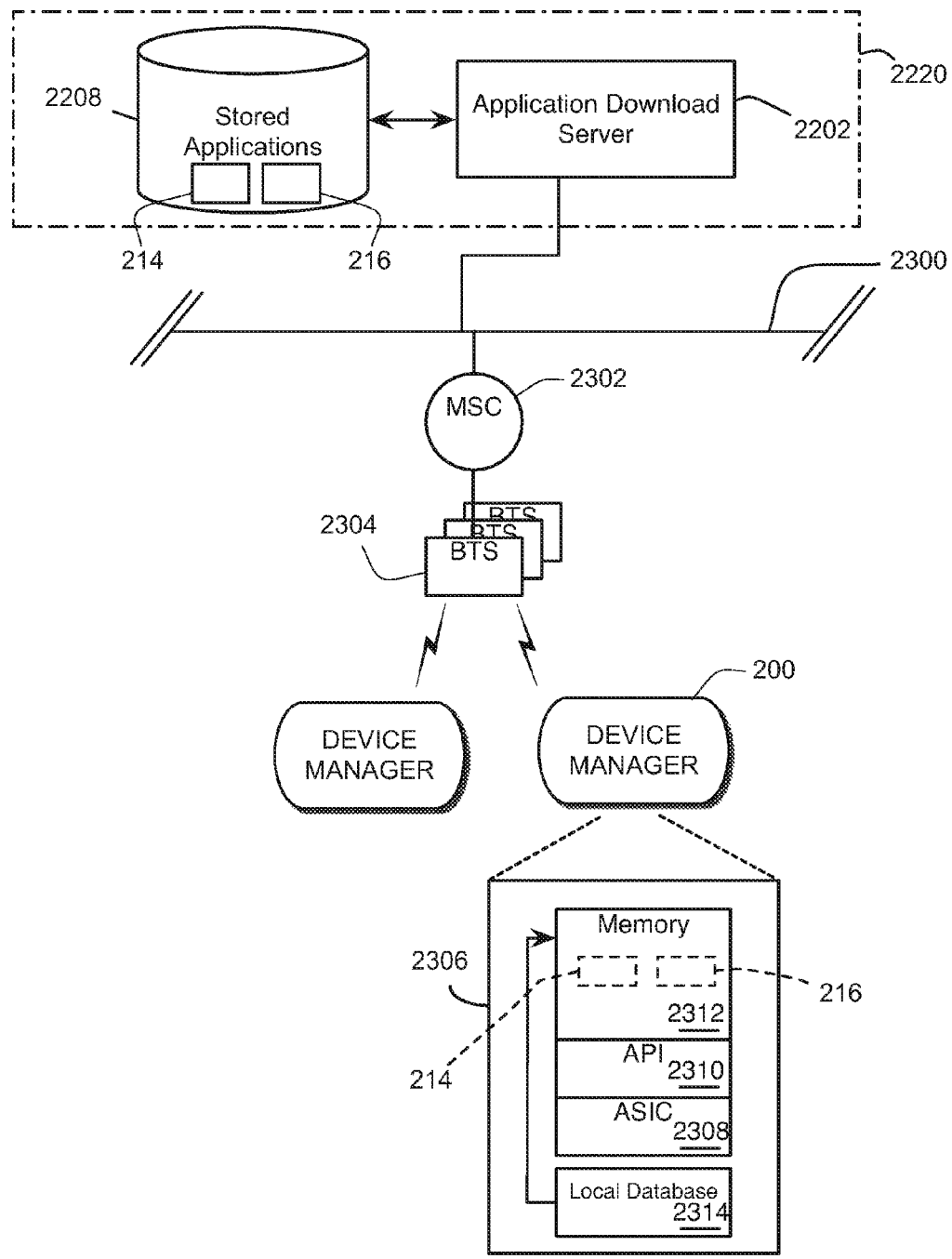
FIG. 23 is a high-level functional block diagram of an environment in which an embodiment is usable.

FIG. 21 is a high-level process flow diagram of the least and other portion 2100 of administration module 516 according to an embodiment. The flow begins at functionality 2102 wherein device manager 106 receives a new service requests from either a client device and/or a network, e.g. wireless network 102. The flow then proceeds to functionality 2104 wherein device manager 106 performs policy management with respect to the received service requests based on network availability and in conjunction with user-defined choices stored in, e.g. a database, of memory 206 (FIG. 2).

Device manager 200 may utilize application programming interfaces (APIs), sometimes referred to as runtime environments and software platforms, that are installed onto their local processing platform and which are used, for example, to simplify operations of such devices, such as by providing generalized calls for device specific resources. Further, some such APIs are also known to provide software developers the ability to create software applications that are fully executable on such devices. In addition, some of such APIs are known to be operationally located between the device manager system software and the software applications such that the device manager computing functionality is made available to the software applications without requiring the software developer to have the specific computing device system source code. Further, some APIs are known to provide mechanisms for secure communications between such devices (i.e., clients) and remote devices (i.e., servers) using secure cryptographic information.

Examples of such APIs, include versions of the Binary Runtime Environment for Wireless (BREW) developed by Qualcomm, Inc., of San Diego, Calif., JAVA developed by Sun Microsystems of Santa Clara, Calif., LINUX, SYMBIAN available from Symbian Software Ltd of Southward, London, and WINMOB.

FIG. 12 depicts a block diagram of one exemplary embodiment of a wireless system 1200. System 1200 can contain device manager 106 and client devices, such as a cellular telephone, e.g., wireless device 112, in communication across wireless network 102 with at least one application download server 1202 that selectively transmits software applications and components to wireless devices, such as device manager 106, across a wireless communication portal or other data access to the wireless network 102. As shown here, the wireless (client) device is device manager 106. For example, wireless device 106 includes a communication interface such as a transceiver or wireless device for transmitting and receiving data, a processor for executing instructions and controlling operation of the wireless device, and a memory for storing the executable instructions, a PDMS 214 (FIG. 2), and one or more parameters 216 (FIG. 2). The embodiments can thus be realized on any form of device manager including a wireless communication portal, e.g., a wireless device, including without limitation, wireless modems, PCMCIA cards, personal computers, access terminals, telephones, or any combination or sub-combination thereof.

The application download server 1202 is shown here on a network 1204 with other computer elements in communication with the wireless network 102. There can be a stand-alone server 1206, and each server can provide separate services and processes to the client devices 106, 1202, across the wireless network 102. System 1200 may also include at least one stored application database 1208 that holds the software applications, e.g., a PDMS 214, that are downloadable by the device manager. However, those skilled in the art will appreciate that the configuration illustrated in FIG. 12 is merely exemplary. Accordingly, other embodiments include one of more servers that each perform all the described functions and contain all necessary hardware and software, or can contain only selected functionality.

In FIG. 13, a block diagram is shown that more fully illustrates system 1200, including the components of the wireless network 102 and interrelation of the elements of the exemplary embodiments. System 1200 is merely exemplary and can include any system whereby remote client devices communicate over-the-air between and among each other and/or between and among components connected via a wireless network 102, including, without limitation, wireless network carriers and/or servers. The application download server 1202 and the stored application database 1208 communicate with a carrier network 1300, through a data link, such as the Internet, a secure LAN, WAN, or other network. Stored application database 1208 includes a PDMS 214 and one or more parameters 216 according to the above-described embodiments for download to each of the device managers 200. Device managers 200 download a copy of PDMS 214 and/or one or more parameters 216 from stored applications database 1208. In the embodiment shown, a server 1220 can include the application download server 1202, distribution server 1206 and the stored application database 1208. However, these servers can also be independent devices.

Still referring to the embodiment of FIG. 13, carrier network 1300 controls messages (generally being data packets) sent to a messaging service controller ("MSC") 1302. Carrier network 1300 communicates with the MSC 1302 through another communications link, such as another network, the Internet, and/or POTS ("plain ordinary telephone system"). Typically, the network or Internet connection between carrier network 1300 and MSC 1302 transfers data, and the POTS transfers voice information. MSC 1302 may be connected to multiple base stations ("BTS") 1304, such as by at least one communications link, including both a data network and/or the Internet for data transfer and POTS for voice information. BTS 1304 ultimately broadcasts messages wirelessly to the device manager 200, in an over-the-air protocol such as short messaging service ("SMS"), etc.

In the embodiment of FIG. 13, each device manager 200, may include a processing platform 1306 that can receive and execute software applications and display data transmitted from computer system 1220 or other network servers 1206. Computer platform 1306 may include an application-specific integrated circuit ("ASIC") 1308, or other chipset, processor, microprocessor, logic circuit, or other data processing device. ASIC 1308 may be installed at the time of manufacture of device manager 200. ASIC 1308 or other processor may execute an application programming interface ("API") layer 1310 that interfaces with any resident programs, e.g., PDMS 214, in a memory 1312 of the wireless device. API 1310 is a runtime environment executing on the computing device, or device manager 200 in this case. One such runtime environment is Binary Runtime Environment for Wireless (BREW) software, although other runtime environments may be utilized that, for example, operate to control the execution of applications on wireless computing devices. Memory 1312, for example, can be comprised of at least one of read-only and random-access memory (ROM and RAM), EPROM, EEPROM, flash cards, and any memory common to computer platforms. The computer platform 1306 may also include a local database 1314 that can hold the software applications, e.g., PDMS 214, one or more parameters 216, files, or data not actively used in memory 1312. Local database 1314 may include at least one of flash memory cells, magnetic media, EPROM, EEPROM, optical media, tape, a soft disk, a hard disk, and any other type of secondary or tertiary memory. Thus, in the embodiment of FIG. 13, each device manager 200 may be loaded with applications such as PDMS 214, one or more parameters 216, and/or data from computer system 1220 in accordance with system 1200.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of managing one or more client devices and one or more device managers arranged to communicate with each other in a personal distributed network, said method comprising:
receiving, by said one or more device managers, a first hardware attribute set and a first service attribute set of a first client device from the first client device;
receiving, by said one or more device managers, a second hardware attribute set and a second service attribute set of a second client device from the second client device;
allocating, by said one or more device managers, a first service component of a first service to the first client device based on the first service attribute set of the first client device corresponding to the first service component;
allocating by said one or more device managers, a second service component of the first service to the second client device based on the second service attribute set of the second client device corresponding to the second service component; and
communicating with at least one of said one or more device managers, the first client device or at least one of a non-primary device manager, a non-primary client device, wherein said one or more device managers and the first and second client devices are each classified as at least one of a primary device, a secondary device, or a universal device according to capabilities of at least one of the hardware or service functionalities of the first and second client devices and when the classification of said one or more device managers differs from the classification of the first or second client device, the communication and capabilities of said one or more device managers or the differently classified client device is restricted to a subset of the corresponding capabilities for at least one of storage capabilities or receiving a set of the first or second client device attributes.

2. The method as claimed in claim 1, wherein communication between said one or more device managers and the first client device is restricted by geographic location when the respective classifications differ.

3. The method as claimed in claim 1, wherein communication between said one or more device managers and the first client device is restricted by time of day when the respective classifications differ.

4. The method as claimed in claim 1, wherein communication between said one or more device managers and the first client device is restricted to certain dates of the calendar when the respective classifications differ.

5. The method as claimed in claim 1, wherein communication between said one or more device managers and the first client device is restricted by an external server or a external client device when the respective classifications differ to prevent at least one of unauthorized access to stored information or use of the first client device.

6. The method as claimed in claim 1, wherein said one or more device managers has only restricted access to a memory of the first client device when the respective classifications differ to prevent at least one of unauthorized access to stored information or use of the device manager.

7. The method as claimed in claim 1, wherein the first client device has only restricted access to a memory of said one or more device managers when the respective classifications differ to prevent at least one of unauthorized access to stored information or use of the first client device.

8. The method as claimed in claim 1, wherein said one or more device managers has only restricted access to the first client device capabilities when the respective classifications differ to prevent at least one of unauthorized access to stored information or use of the first client device.

9. The method as claimed in claim 1, wherein the first client device has only restricted access to said one or more device managers capabilities when the respective classifications differ to prevent at least one of unauthorized access to stored information or use of the first client device.

10. The method as claimed in claim 1, wherein one or more of the restrictions to a subset of communication between the first client device are temporarily removed by a user when the respective classifications differ to prevent at least one of unauthorized access to stored information or use of the first client device.

11. The method as claimed in claim 1, further comprising:
storing information pertaining to the first service component based on at least one of user preferences or service component information in said one or more device managers if said one or more device managers is a primary device and the first client device is a secondary device.

12. The method as claimed in claim 1, further comprising:
protecting information, involved in a communication of the first service component, in said one or more device managers and the first client device if the communication is from said one or more device managers to the first client device and said one or more device managers is a primary device and the first client device is a secondary device.

13. The method as claimed in claim 1, wherein the protecting information is determined by user settings stored in said one or more device managers.

* * * * *